United States Patent
Fukuoka et al.

(10) Patent No.: US 6,983,058 B1
(45) Date of Patent: Jan. 3, 2006

(54) METHOD OF EMBEDDING DIGITAL WATERMARK, STORAGE MEDIUM IN WHICH THE METHOD IS STORED, METHOD OF IDENTIFYING EMBEDDED DIGITAL WATERMARK, AND APPARATUS FOR EMBEDDING DIGITAL WATERMARK

(75) Inventors: Yoshihide Fukuoka, Yokosuka (JP); Kineo Matsui, Yokosuka (JP)

(73) Assignee: Kowa Co., Ltd., Aichi-ken (JP)

( * ) Notice: Subject to any disclaimer, the term of this patent is extended or adjusted under 35 U.S.C. 154(b) by 0 days.

(21) Appl. No.: 09/786,664

(22) PCT Filed: Sep. 8, 1999

(86) PCT No.: PCT/JP99/04890

§ 371 (c)(1),
(2), (4) Date: May 31, 2001

(87) PCT Pub. No.: WO00/16546

PCT Pub. Date: Mar. 23, 2000

(30) Foreign Application Priority Data

Sep. 10, 1998 (JP) ................................. 10-276490
Oct. 27, 1998 (JP) ................................. 10-322899

(51) Int. Cl.
*G06K 9/00* (2006.01)

(52) U.S. Cl. ................................................ 382/100
(58) Field of Classification Search ................ 382/100, 382/232, 248, 250, 276, 280, 281, 240
See application file for complete search history.

(56) References Cited

U.S. PATENT DOCUMENTS 6,240,121 B1 * 5/2001 Senoh ........................ 375/130
6,252,971 B1 * 6/2001 Wang ......................... 382/100
6,332,030 B1 * 12/2001 Manjunath et al. .......... 382/100
6,359,998 B1 * 3/2002 Cooklev ..................... 382/100

OTHER PUBLICATIONS

Ó Ruanaidh et al, "Phase Watermarking of Digital Images", Image Processing, 1996. Proceedings., International Conference on, vol.: 3, Sep. 16-19, 1996.*

Primary Examiner—Jose L. Couso
Assistant Examiner—Tom Y. Lu
(74) Attorney, Agent, or Firm—Beyer, Weaver & Thomas

(57) ABSTRACT

The procedure of the present invention specifies predetermined elements included in a matrix F which is obtained by Fourier transform of master image data P0 (step S122), and adds a minute variation ΔF of a predetermined magnitude to either a real number array FR or an imaginary number array FI of the predetermined elements (step S124 and S126). Here note that the minute variation ΔF should be subtracted from corresponding elements, in order to keep the symmetry of the Fourier spectrum. A resulting image obtained by an inverse transform of the matrix with the minute variation ΔF added thereto includes a phase difference pattern W01 that is embedded therein and corresponds to the minute variation ΔF. As long as a master image is closed to the public, this embedded pattern can not be taken out of the resulting image nor be deleted by overwriting attacks. Even if the processed data with the digital watermark embedded therein is exposed to overwriting attacks of different pieces of watermark information by the similar algorithm, the arrangement of the information enables the digital watermark embedded in the master data to be taken out accurately. The similar series of processing may be carried out with regard to a specific area of the low frequency component obtained by wavelet transform of the mater image.

12 Claims, 21 Drawing Sheets

P 0

P 1

|W 0 1|

Fig.5A

REAL NUMBER ARRAY FR

|     | 253   | 254   | 255   | 0     | 1     | 2     | 3     |
|-----|-------|-------|-------|-------|-------|-------|-------|
| 253 | 0.28  | -0.12 | -0.14 | -0.04 | 0.17  | 0.09  | 0.02  |
| 254 | 0.02  | 0.20  | -0.32 | 0.38  | -0.07 | -0.23 | -0.17 |
| 255 | 0.02  | -0.07 | -0.35 | -0.09 | -0.01 | 0.25  | 0.22  |
| 0   | 0.13  | -0.16 | -0.03 | 6.46  | -0.03 | -0.16 | 0.13  |
| 1   | 0.22  | 0.25  | -0.01 | -0.09 | -0.35 | -0.07 | 0.02  |
| 2   | -0.17 | -0.23 | -0.07 | 0.38  | -0.32 | 0.20  | 0.02  |
| 3   | 0.02  | 0.09  | 0.17  | -0.04 | -0.14 | -0.12 | 0.28  |

IMAGINARY NUMBER ARRAY FI

|     | 253   | 254   | 255   | 0     | 1     | 2     | 3     |
|-----|-------|-------|-------|-------|-------|-------|-------|
| 253 | 0.21  | -1.93 | 4.74  | -1.91 | 2.72  | 2.74  | 0.42  |
| 254 | -1.47 | 1.47  | 0.64  | 2.49  | 0.77  | -0.82 | 0.42  |
| 255 | 1.46  | 0.69  | -4.67 | -7.07 | 3.30  | -0.19 | -2.01 |
| 0   | -0.80 | -0.06 | 2.85  | 0.00  | -2.85 | 0.06  | 0.80  |
| 1   | 2.01  | 0.19  | -3.30 | 7.07  | 4.67  | -0.69 | -1.46 |
| 2   | -0.42 | 0.82  | -0.77 | -2.49 | -0.64 | -1.47 | 1.47  |
| 3   | -0.42 | -2.74 | -2.72 | 1.91  | -4.74 | 1.93  | -0.21 |

$1.0e+005 *$

|W01|

|W' 01|

|W01|

P'1

|W'01|

|W01|

P' 1

|W' 01|

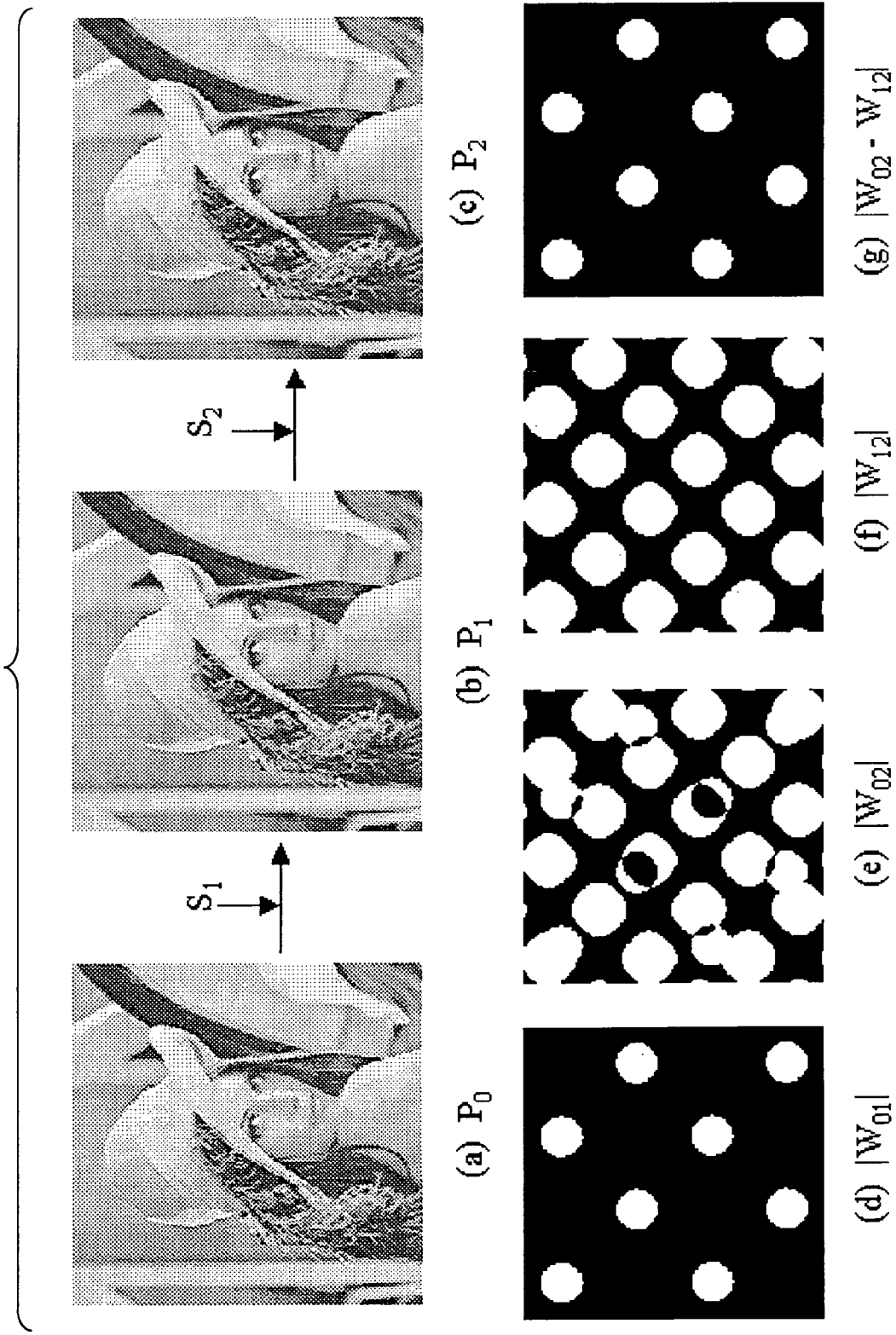

PIXEL AREA

TRANSFORMED AREA

LL2

PROCESSED IMAGE WITH
EMBEDDED PATTERN

PHASE DIFFERENCE
PATTERN

Q0　　S1　　Q1　　S2　　Q2

|W01|　　|W02|　　|W12|　　|W02−W12|

|   | 254 | 255 | 0 | 1 | 2 |
|---|---|---|---|---|---|
| 254 | 0.00 | 0.00 | 0.00 | 0.00 | 0.00 |
| 255 | 0.00 | 0.00 | 0.00 | 0.00 | 0.00 |
| 0 | 0.00 | 0.00 | 0.00 | 0.00 | -3.00 |
| 1 | 0.00 | 0.00 | 0.00 | 0.00 | 0.00 |
| 2 | 0.00 | 0.00 | -3.00 | 0.00 | 0.00 |

1.0 e+004*

|S1−S3|

*Fig.18A*
 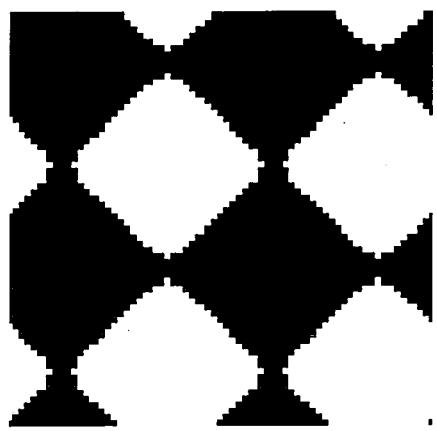
$\Delta = 5.0 * 10\ e\ 2$
*Fig.18B*
 
$\Delta = 3.0 * 10\ e\ 2$
*Fig.18C*
 
$\Delta = 1.0 * 10\ e\ 2$

W01

Q'1

W'01

W"12

W'02

W'12

W01

Q'1

W'01

W"12

W'02

W'12

W01

Q'1

W'01

W"12

W'02

W'12

W01

Q'1

W'01

W"12

W'02

W'12

METHOD OF EMBEDDING DIGITAL WATERMARK, STORAGE MEDIUM IN WHICH THE METHOD IS STORED, METHOD OF IDENTIFYING EMBEDDED DIGITAL WATERMARK, AND APPARATUS FOR EMBEDDING DIGITAL WATERMARK

TECHNICAL FIELD

The present invention relates to a digital watermarking technique and more specifically to a technique that embeds watermark information in data, such as image data.

BACKGROUND ART

A variety of digital watermarking techniques have been proposed to embed copyright information in digitalized copies of images and music. Digitalized data is readily copied in a complete form (namely, digitalized data has perfect reproducibility), so that the protecting measure is required against illegal copies. The digital watermarking technique electronically embeds watermark information, such as copyright information, in master data in a human-imperceptible manner. The embedded watermark information can be taken out according to the requirements. The digital watermark clearly shows any third party the presence of the copyright in digitalized copies of images and music. The digital watermark generally includes information for identifying the copyright holder. The data with the digital watermark embedded therein may thus be referred to as the authorized data.

The prior art digital watermarking technique, however, has the drawback that the legal watermark information is not taken out accurately when another piece of information overwrites the existing information by a similar procedure. Alteration to invalidate the digital watermark embedded in the authorized data may hereinafter be referred to as the overwriting attack against the digital watermark. When the authorized data is exposed to the overwriting attack to prevent the embedded legal digital watermark from being normally read, the digital watermarking loses its significance. If only an unauthorized watermark is left as the result of the overwriting attack, this allows even the illegal alteration of the signature of the copyright holder.

Electronic data are generally compressed for the purpose of delivery or storage. The digital watermark data embedded by the prior art digital watermarking technique, however, may be altered or even deleted by such data compression. Namely the prior art technique is not sufficiently practical.

DISCLOSURE OF THE INVENTION

The object of the present invention is to solve the drawbacks of the prior art technique discussed above and thus to provide an embedding technique that ensures the good preservation of a legal digital watermark and the high secrecy of the digital watermark to any third party even when electronic data open to the public is exposed to overwriting attacks and data compression.

At least part of the above and the other related objects is attained by a method of embedding watermark information in master data. The method includes the steps of: (a) causing the master data to be subjected to discrete Fourier transform; (b) adding a minute variation, which corresponds to a phase difference pattern determined in advance as the watermark information, to either one of a real number array and an imaginary number array of the master data obtained by the discrete Fourier transform, so as to generate resulting data with the minute variation added thereto; and (c) causing the resulting data with the minute variation added thereto to be subjected to inverse Fourier transform, so as to generate authorized data with the watermark information embedded therein.

The present invention is also directed to an apparatus for embedding watermark information in master data, which corresponds to the above method. The apparatus includes: a transform unit that causes the master data to be subjected to discrete Fourier transform; a phase difference pattern addition unit that adds a minute variation, which corresponds to a phase difference pattern determined in advance as the watermark information, to either one of a real number array and an imaginary number array of the master data obtained by the discrete Fourier transform, so as to generate resulting data with the minute variation added thereto; and an inverse Fourier transform unit that causes the resulting data with the minute variation added thereto to be subjected to inverse Fourier transform, so as to generate authorized data with the watermark information embedded therein.

This technique utilizes the characteristics that a variation of either a real number array or an imaginary number array in a spectrum, which is obtained by discrete Fourier transform of master data in a frequency domain, leads to a variation in phase. The technique of the present invention adds a minute variation corresponding to a phase difference pattern to either the real number array or the imaginary number array obtained by the discrete Fourier transform of the master data and subsequently carriers out an inverse transform of the processed data, so as to generate authorized data with watermark information embedded therein. The phase difference pattern is taken out through comparison between the master image data and the authorized data. This arrangement enables the user to intuitively grasp the embedded digital watermark as the phase difference pattern. As long as the master data without the digital watermark embedded therein is not identified, the phase difference pattern can be taken out accurately even after overwriting attacks.

The phase difference pattern is readily written by adding a minute variation $\Delta F$ to a spectrum $F(m,n)$ of a specific frequency $(m,n)$ in either one of the real number array and the imaginary number array obtained by the discrete Fourier transform.

Here it is favorable to carry out the addition of the minute variation $\Delta F$ to either the real number array or the imaginary number array while keeping the symmetry of either the real number array or the imaginary number array. As the results of the discrete Fourier transform, the real number array has even symmetry and the imaginary number array has odd symmetry. The addition of the minute variation by considering these points enables good preservation of the intrinsic characteristics of the master data.

The minute variation added as the digital watermark naturally affects the master data. In order to prevent the deteriorating quality of the master data, it is accordingly practical that the minute variation added is within a range of 2 to 10% of the spectrum.

It is also favorable to add the minute variation to a component in a low frequency domain of the real number array or the imaginary number array. In the case of addition to the high frequency component, data compression like JPEG may result in losing the watermark information. In the case of addition to the low frequency domain, on the other hand, data compressing does not cause the phase difference pattern as the digital watermark to be lost. The phase difference pattern may, however, be added to the high frequency domain in the case where consideration is given to only reversible compression methods that store the data in the course of compression and restore the original information to a perfect form by expansion of the data.

When there is data with a digital watermark embedded therein according to the method discussed above, that is, when there is authorized data, the method of detecting the watermark information in the authorized data is closely related to the method of embedding the digital watermark discussed above. These two methods accordingly fulfill the unity condition of the inventions. The present invention is thus directed to a method of detecting watermark information, which includes the steps of: taking out a difference between the master data and the authorized data as a phase difference pattern; and detecting the phase difference pattern as a digital watermark of the authorized data.

This method of detecting the digital watermark adopts the extremely simple technique but is still sufficiently effective. As long as the master data is closed to the public, only the legal owner of the master data can detect the digital watermark. It is extremely difficult to assume the embedded minute variation without the master data.

In order to add the minute variation in such a manner that the digital watermark is not lost by data compression, one applicable method carries out a predetermined data transform to obtain a specific data portion mainly corresponding to a low frequency component from master data, prior to discrete Fourier transform of master data. The method then causes the specific data portion to be subjected to discrete Fourier transform and adds a minute variation corresponding to a predetermined phase difference pattern as watermark information to either one of a real number array or an imaginary number array obtained by the discrete Fourier transform. After the addition of the minute variation, the method carriers out inverse Fourier transform and subsequently an inverse transform of the predetermined data transform. The combination of the data compression with the discrete Fourier transform enables the digital watermark to be accurately embedded in the low frequency domain. This method ensures the high resistance against the overwriting attacks, which is discussed above as the effect of the method of embedding the digital watermark by the discrete Fourier transform, and also effectively prevents the digital watermark data from being altered or deleted by the high degree of data compression. A typical example of the data transform and the inverse data transform is wavelet transform and inverse wavelet transform. Using the wavelet transform and the inverse wavelet transform desirably simplifies the procedures of embedding and restoring watermark information. Any of various known techniques is applicable for the wavelet transform here. A typical example is orthogonal wavelet transform using the Haar basis. Any data transform and inverse data transform other than the wavelet transform and the inverse wavelet transform is also applicable for this method, as long as it follows a transform algorithm to obtain a specific data portion mainly corresponding to the low frequency domain.

When there is authorized data with a digital watermark embedded therein according to the method discussed above, the method of detecting the watermark information is closely related to the method of embedding the digital watermark discussed above. These two methods accordingly fulfill the unity condition of the inventions. The present invention is thus directed to a method of detecting watermark information, which includes the steps of: causing the master data to be subjected to the predetermined data transform of the step (a0); causing the authorized data to be subjected to the predetermined data transform of the step (a0); taking out a difference between the transformed master data and the transformed authorized data as a phase difference pattern; and detecting the phase difference pattern as a digital watermark of the authorized data.

This method of detecting the digital watermark adopts the extremely simple technique but is still sufficiently effective. As long as the master data is closed to the public, only the legal owner of the master data can detect the digital watermark. It is extremely difficult to assume the embedded minute variation without the master data. For the enhanced safety, it is preferable to conceal the technique applied for the data transform that enables specification of the area mainly corresponding to the low frequency component.

The technique of embedding the digital watermark is applicable for a diversity of data. For example, the master data may be two-dimensional image data. In this case, the phase difference pattern embedded according to the above method is not visually recognizable on the image and causes substantially no deterioration of the picture quality. This technique is also applicable for one-dimensional data, such as sound data.

The embedding method and the embedding apparatus discussed above may be actualized by an application that causes a general-purpose or exclusively used computer to read a storage medium, such as an IC card, a flexible disk, or a CD-ROM, and executes a program stored in the storage medium.

The present invention is thus directed to a storage medium in which a specific program used to embed watermark information in master data is stored in a computer readable manner. The specific program causes a computer to attain the functions of: inputting the master data; causing the input master data to be subjected to discrete Fourier transform; adding a minute variation, which corresponds to a phase difference pattern determined in advance as the watermark information, to either one of a real number array and an imaginary number array of the master data obtained by the discrete Fourier transform, so as to generate resulting data with the minute variation added thereto; and causing the resulting data with the minute variation added thereto to be subjected to inverse Fourier transform, so as to generate authorized data with the watermark information embedded therein, and outputting the authorized data.

The method of embedding the digital watermark by the combination of the high degree of data compression with the discrete Fourier transform is also actualized by the application that causes the computer to read the storage medium.

The present invention is accordingly directed to a storage medium in which a specific program used to embed watermark information in master data is stored in a computer readable manner. The specific program causes a computer to attain the functions of: inputting the master data; causing the master data to be subjected to a predetermined data transform, which converts the master data to a specific data form that enables an area mainly corresponding to a low frequency component to be specified; causing a specific data portion corresponding to the area out of the converted data to be subjected to discrete Fourier transform; adding a minute variation, which corresponds to a phase difference pattern determined in advance as the watermark information, to either one of a real number array and an imaginary number array of the specific data portion obtained by the discrete Fourier transform, so as to generate resulting data with the minute variation added thereto; causing the resulting data with the minute variation added thereto to be subjected to inverse Fourier transform; and causing the resulting data, which has undergone the inverse Fourier transform, as well as a residual data portion corresponding to a residual area to be subjected to an inverse transform of the predetermined data transform, so as to generate authorized data with the watermark information embedded therein.

The computer generally has the functions of the discrete Fourier transform and the data compression in the form of a library. The function of causing the master data to be subjected to the discrete Fourier transform may thus be replaced by 'the function of utilizing the computer function that carries out the discrete Fourier transform of the input master data and receiving a real number array or an imaginary number array obtained as a result of the discrete Fourier transform'. In a similar manner, the function of data transform may be replaced by 'the function of utilizing the computer function that converts the input master data into a specific data form, which enables specification of the area mainly corresponding to the low frequency component, and receiving the result of the data transform'.

It is relatively easy to discriminate the overwriting attack against the master data with the digital watermark embedded therein by another technique. The overwriting attach by the same technique is the most serious problem. The effective measure against such an overwriting attack is a method of identifying a phase difference pattern W1 that is watermark information embedded in master data P0, when there is data Pi obtained by embedding other phase difference patterns Wi (i=2,3,. . .) in authorized data P1 as watermark information a plurality of times according to the embedding method discussed above, where the authorized data P1 is obtained by legally embedding the phase difference pattern W1 in the master data P0 as the watermark information. The method of identifying the phase difference pattern W1 as the digital watermark information has thus been developed in relation to the embedding method. Namely the embedding method and the identifying method fulfill the unity condition of the inventions. The identifying method includes the steps of: (d) taking out a difference between the master data P0 and the data P1 with the other phase difference patterns embedded therein the plurality of times; (e) taking out a difference between the authorized data P1 and the data Pi with the other phase difference patterns embedded therein the plurality of times; and (f) extracting an eventual difference between the difference taken out in the step (d) and the difference taken out in the step (e) as the legal phase difference pattern W1.

The present invention is also directed to a method of identifying a phase difference pattern W1 that is watermark information embedded in practical master data Q0, when there is data Qi obtained by embedding other phase difference patterns Wi (i=2,3, . . .) in authorized data Q1 as watermark information a plurality of times according to the similar embedding method, where the authorized data Q1 is obtained by converting master data P0 to a specific data form that enables an area mainly consisting of a low frequency component to be specified and then legally embedding the phase difference pattern W1 in the area as the watermark information. The identifying method includes the steps of: (g) taking out a difference between the practical master data Q0 and the data Qi with the other phase difference patterns embedded therein the plurality of times; (h) taking out a difference between the authorized data Q1 and the data Qi with the other phase difference patterns embedded therein the plurality of times; and (i) extracting an eventual difference between the difference taken out in the step (g) and the difference taken out in the step (h) as the legal phase difference pattern W1.

Even when the plurality of overwriting attacks are made, these methods enable extraction of the phase difference pattern legally embedded in the master data and easy identification of the legal data.

The present invention further includes other applications. A first application replaces the Fourier transform with another equivalent transform. Any transform technique is applicable as long as it gives a real number array and an imaginary number array as the result of the transform in a frequency domain. A second application is a program supply device that supplies a specific computer program, which causes the computer to attain the respective steps or the functions of the respective units discussed above, via a communication path. In this application, programs are stored, for example, in a server on a network and a required program is downloaded to the computer via the communication path and executed to attain the method or the apparatus discussed above. Still another application causes a site (server) located on a network like the Internet to carry out embedding, detection, and identification of the watermark information. In this application, a user who requires embedding, detection, or identification of the watermark information transmits digitalized information like image data to the site on the network, where the process of embedding, detecting, or identifying the watermark information is carried out automatically or manually, and receives the processed data via the network.

BRIEF DESCRIPTION OF THE DRAWINGS

FIG. 5 shows part of a real number array FR of the Fourier transform spectrum obtained in the embodiment;

FIG. 5B shows part of an imaginary number array FI of the Fourier transform spectrum obtained in the embodiment;

FIG. 10 shows the influence of multiple overwriting attacks on the image and the phase difference pattern;

FIG. 17J shows the difference |S1a–S1b| between the frequency spectra F1a and F1b;

FIGS. 18A through 18C show results of evaluation of the picture quality by embedding of watermark;

BEST MODE OF CARRYING OUT THE INVENTION

A. General Structure of Apparatus

Figure 1:
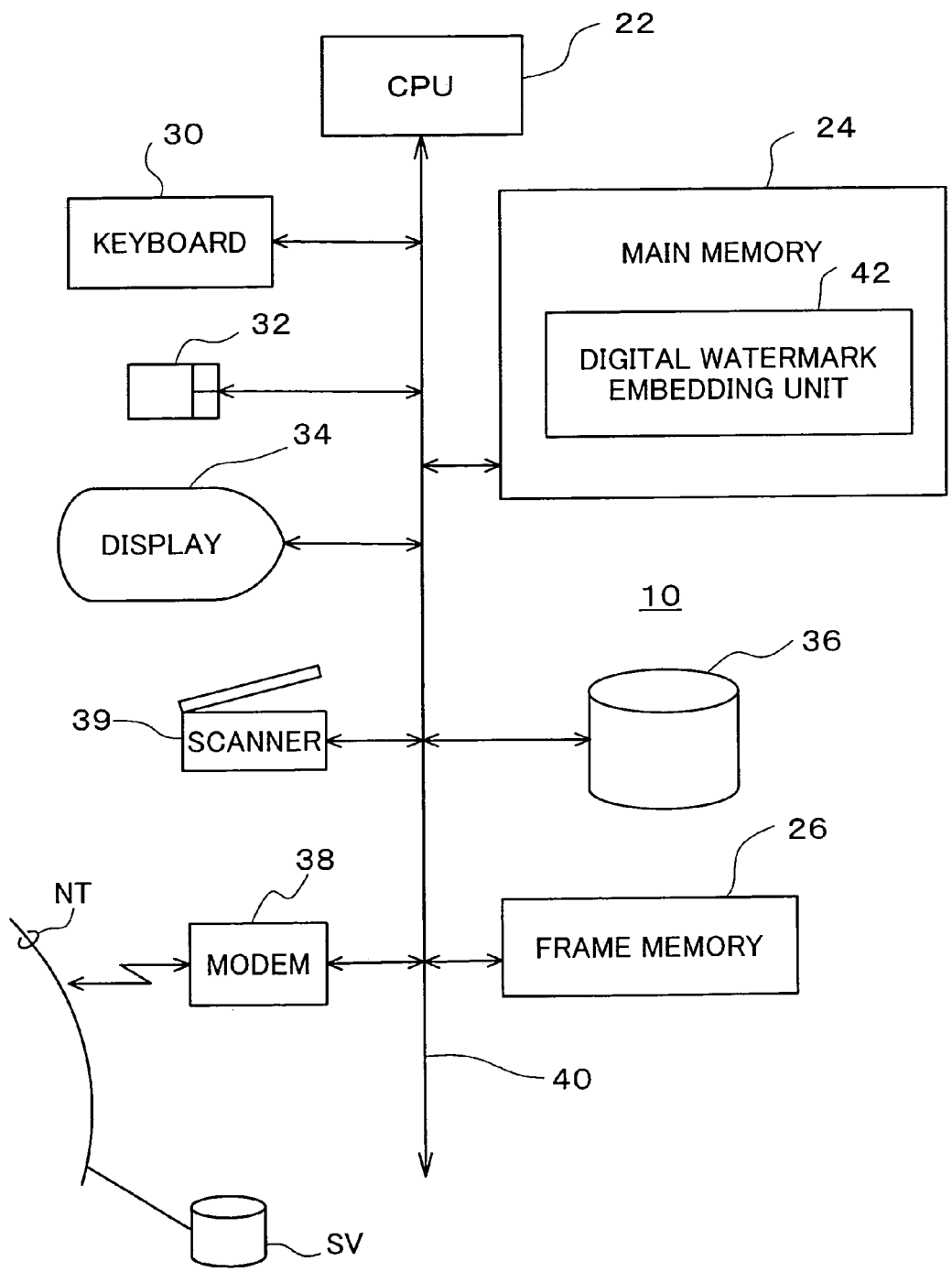
FIG. 1 is a block diagram illustrating the structure of a digital watermark processing apparatus in a first embodiment of the present invention.

Some mode of carrying out the present invention are discussed below as preferred embodiments. FIG. 1 is a block diagram illustrating the structure of a digital watermark processing apparatus 10 in one embodiment of the present invention. The digital watermark processing apparatus 10 is a computer including a CPU 22, a main memory 24 including a ROM and a RAM, a frame memory 26, a keyboard 30, a mouse 32, a display unit 34, a hard disk 36, a modem 38, a scanner 39 that reads images, and a bus 40 that connects the preceding constituents with one another. A diversity of interface circuits are omitted from the illustration of FIG. 1. The modem 28 is connected to a computer network NT via a non-illustrated communication line. A server SV on the computer network NT functions as a program supply device that supplies any required computer program to the digital watermark processing apparatus 10 via the communication line.

A computer program is stored in the main memory 24 to attain the functions of a digital watermark embedding unit 42. The functions of the digital watermark embedding unit 42 will be discussed later.

The computer program that attains the functions of the digital watermark embedding unit 42 is provided in a specific form recorded in a computer readable recording medium, such as a flexible disk or a CD-ROM. The computer reads the computer program from the recording medium and transfers the computer program to either an internal storage device or an external storage device. Alternatively the computer program may be supplied to the computer via the communication path. A microprocessor included in the computer executes the computer program stored in the internal storage device to attain the functions specified by the computer program. In accordance with an alternative procedure, the computer reads the computer program recorded in the recording medium and directly executes the computer program.

In the specification hereof, the term 'computer' expresses the concept including a hardware device and an operating system and thus represents the hardware device working under the control of the operating system. In the case where the operating system is not required but an application program alone can activate the hardware device, the hardware device itself is equivalent to the computer. The hardware device includes at least a microprocessor like a CPU and means for reading the computer program recorded in the recording medium. The computer program includes program codes that cause the computer to attain the functions of the respective units discussed previously. Part of the functions may be attained not by the application program but by the operating system.

Typical examples of the 'recording medium' adopted in the present invention include flexible disks, CD-ROMs, magneto-optic discs, IC cards, ROM cartridges, punched cards, prints with barcodes or other codes printed thereon, internal storage devices (memories like a RAM and a ROM) and external storage devices of the computer, and a variety of other computer readable media.

First Embodiment

Figure 2:
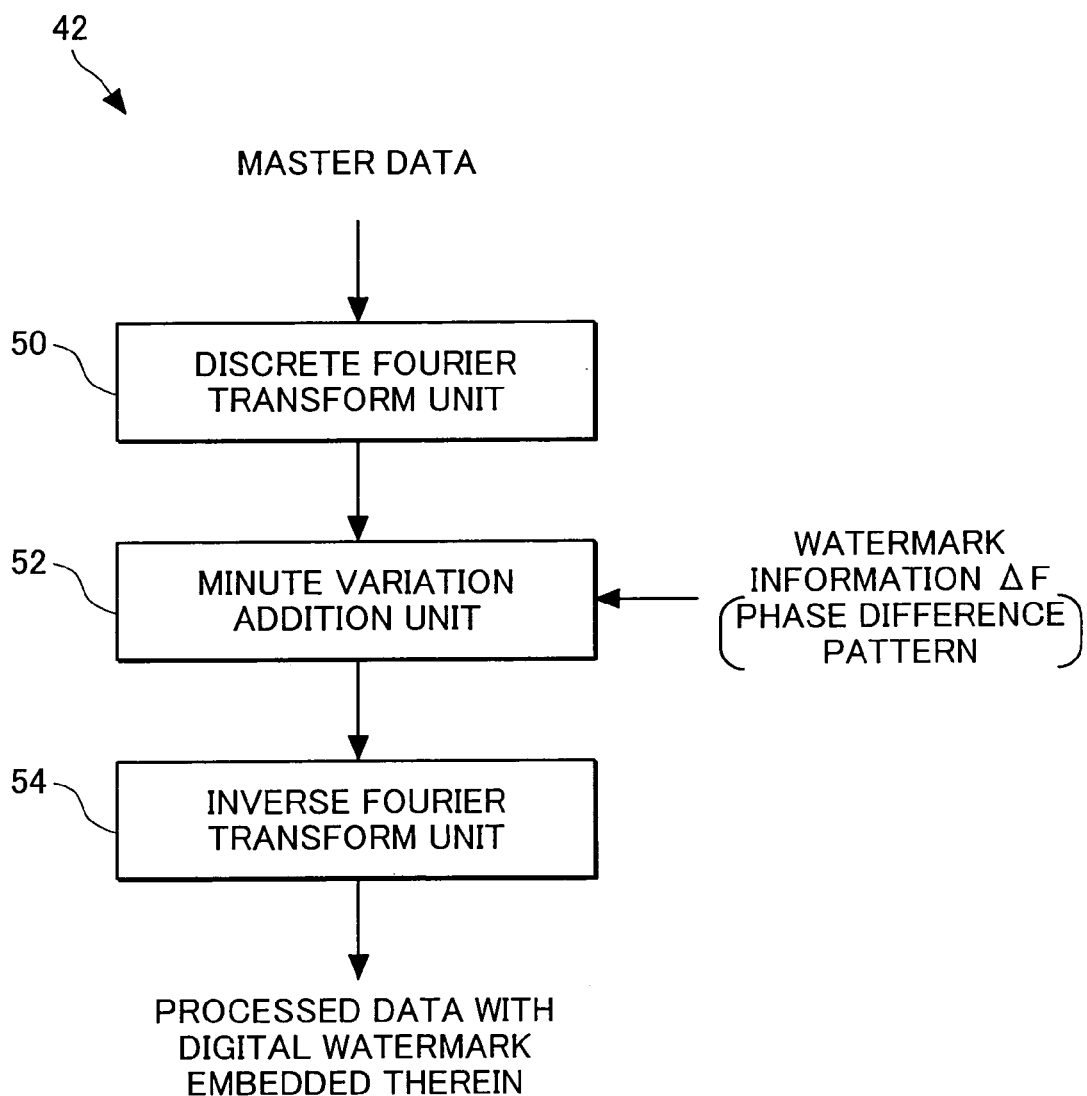
FIG. 2 is a block diagram showing the functions of a digital watermark embedding unit 42.

B. Process of Embedding Watermark Information 1:

FIG. 2 is a block diagram illustrating the functions of the digital watermark embedding unit 42 that regulates the phase of either a real number array and an imaginary number array obtained by discrete Fourier transform and thereby embeds watermark information. The digital watermark embedding unit 42 includes a discrete Fourier transform unit 50, a minute variation addition unit 52, and an inverse Fourier transform unit 54. These units respectively correspond to the transform unit, the phase difference pattern addition unit, and the inverse Fourier transform unit of the present invention.

The functions of the respective units are described briefly. The discrete Fourier transform unit 50 causes image data read by the scanner 39 to undergo discrete Fourier transform. Discrete Fourier transform F of an image P0, which includes M pixels in the horizontal direction and N pixels in the vertical direction, is expressed by Equation (1) given below, when p(m,n) denotes a pixel value of the image P0. Here m=0, 1, . . . , M-1 and n=0, 1, . . . N-1.

$$F(u, v) = \frac{1}{MN} \sum_{m=0}^{M-1} \sum_{n=0}^{N-1} p(m, n)W \quad (1)$$

$$W = e^{-j2\pi(mu/M+nv/N)}$$

where $j=\sqrt{-1}$.

The matrix F obtained by the discrete Fourier transform (the Fourier spectrum) represents the spatial frequency component of the image P0. Since $\exp(-j\theta)=\cos\theta\pm j\sin\theta$ according to the Euler's formula, a real number array FR(u,v) of the above matrix F has even symmetry and an imaginary number array FI(u,v) has odd symmetry. The relationships expressed by Equations (2) given below hold with regard to $F(\pm u, \pm v)$, where =0, 1, 2, . . . , M-1 and v=0, 1, 2, . . . , N-1:

F(u,-v)=F(u,N-v);

F(-u,v)=F(M-u,v); and

F(-u,-v)=F(M-u,N-v). (2)

Further extension by noting the periodicity of the above matrix gives the equation of:

$$F(aM+u, bN+v) = F(u,v)$$

where both a and b denote integers.

The minute variation addition unit 52 embeds the phase difference pattern as the digital watermark in the matrix F obtained by the discrete Fourier transform unit 50. The actual procedure of embedding the phase difference pattern will be discussed later. A minute deviation is added to the predetermined spectrum of the matrix, in order to keep the symmetry of the matrix obtained by the Fourier transform.

The inverse Fourier transform unit 54 causes the resulting data with the phase difference pattern embedded therein as the digital watermark to be subjected to an inverse transform of the discrete Fourier transform carried out by the discrete Fourier transform unit 50. The inverse transform is expressed by Equation (3) given below, based on the expression of Equation (1):

$$p(m,n) = \sum_{u=0}^{M-1} \sum_{v=0}^{N-1} F(u,v) W^{-1} \quad (3)$$

Here an inversely transformed pixel value p (m,n) also has the symmetry discussed above and holds the relationship of:

$$p(aM+m, bN+n) = p(m,n)$$

Figure 3:
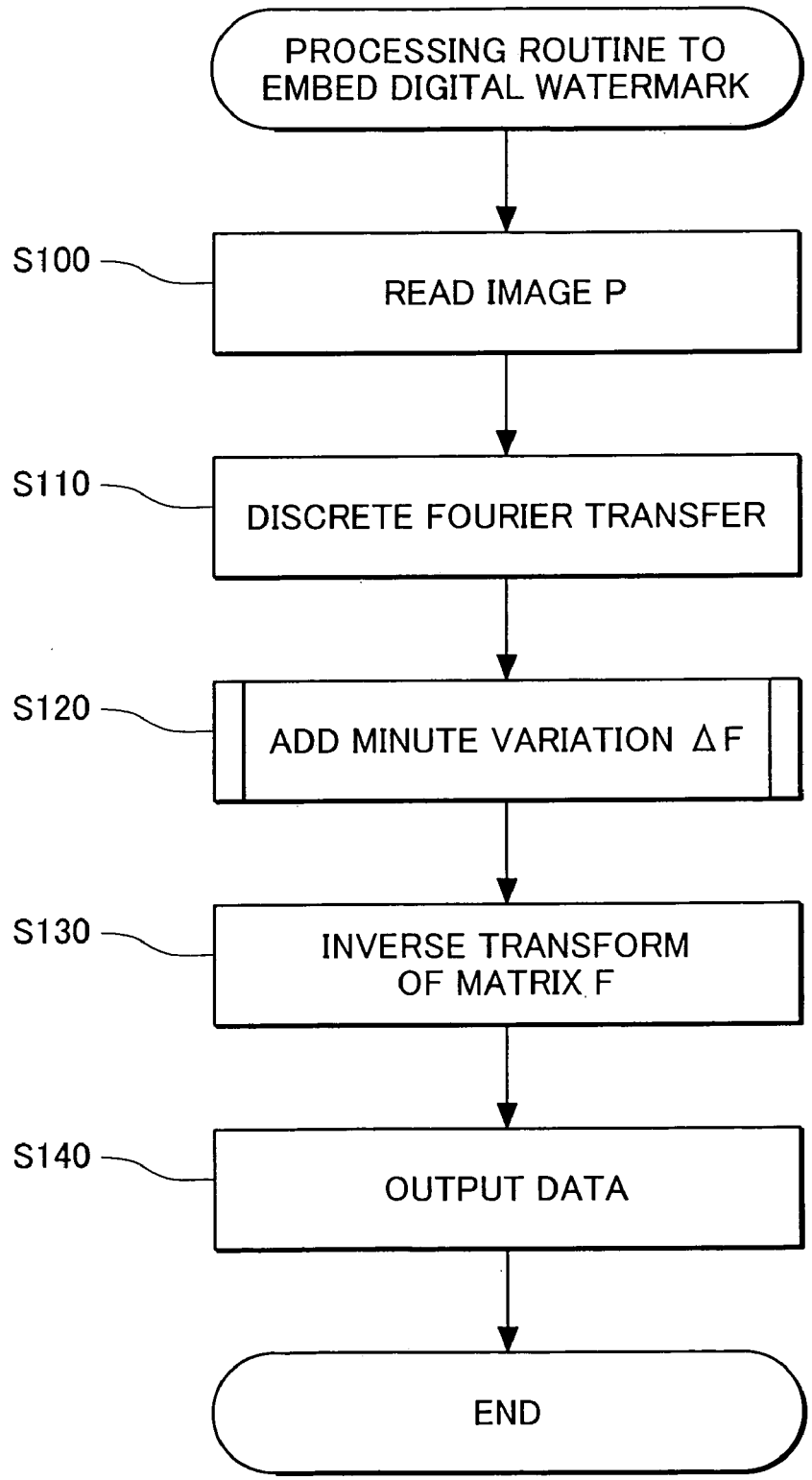
FIG. 3 is a flowchart showing a processing routine to embed watermark information executed in the first embodiment.
Figure 4A:
FIG. 4 shows an example of a master image P0, an image P1 with a digital watermark embedded therein, and an embedded phase difference pattern W01 discussed in the embodiment.

The following describes the technique of embedding the digital watermark in this embodiment, especially a series of the processing carried out by the minute variation addition unit 52, with referring to the flowchart of FIG. 3. The flowchart of FIG. 3 shows a processing routine executed by the CPU 22 to embed a digital watermark. When the program enters the digital watermark embedding routine, the CPU 22 first reads the image P0 (step S100). This process may be attained by driving the scanner 39 to directly read image data from a photograph or another original or by reading an image file provided in advance. In the latter case, the image file may be stored in, for example, a CD-ROM or alternatively be transmitted by communications via the modem 38. FIG. 4A shows an example of the input image P0. This input image P0 consists of 256×256 pixels, where each pixel has a tone value in the range of 256 tones (8 bits).

The CPU 22 then causes the input image data to undergo discrete Fourier transform (step S110). The discrete Fourier transform is carried out as the operation by the discrete Fourier transform unit 50 as discussed above. The discrete Fourier transform unit 50 may be actualized by an exclusive processor or as operations by the CPU 22. The process of carrying out the discrete Fourier transform (DFT) is provided in the form of a library as well known in the art and is not specifically described here.

Figure 4B:

The discrete Fourier transform gives the matrix F(u,v). Part of the matrix F thus obtained is shown in FIG. 5. As a matter of convenience, FIG. 5 shows only the part relating to elements u,v=0,1,2,3 and u,v=253, 254, and 255. FIG. 5A shows the coefficients of the real number array FR, and FIG. 5B shows the coefficients of the imaginary number array FI. For better understanding of the symmetry discussed above, the element (0,0) is on the center of the arrays in FIGS. 5A and 5B. The CPU 22 subsequently adds a minute variation to the matrix F (step S210), causes the matrix F with the minute variation added thereto to undergo an inverse transform (step S130), and outputs the result of the inverse transform as image data with the digital watermark embedded therein (step S140). A resulting image P1 with the digital watermark embedded therein is shown in FIG. 4B.

Figure 6:
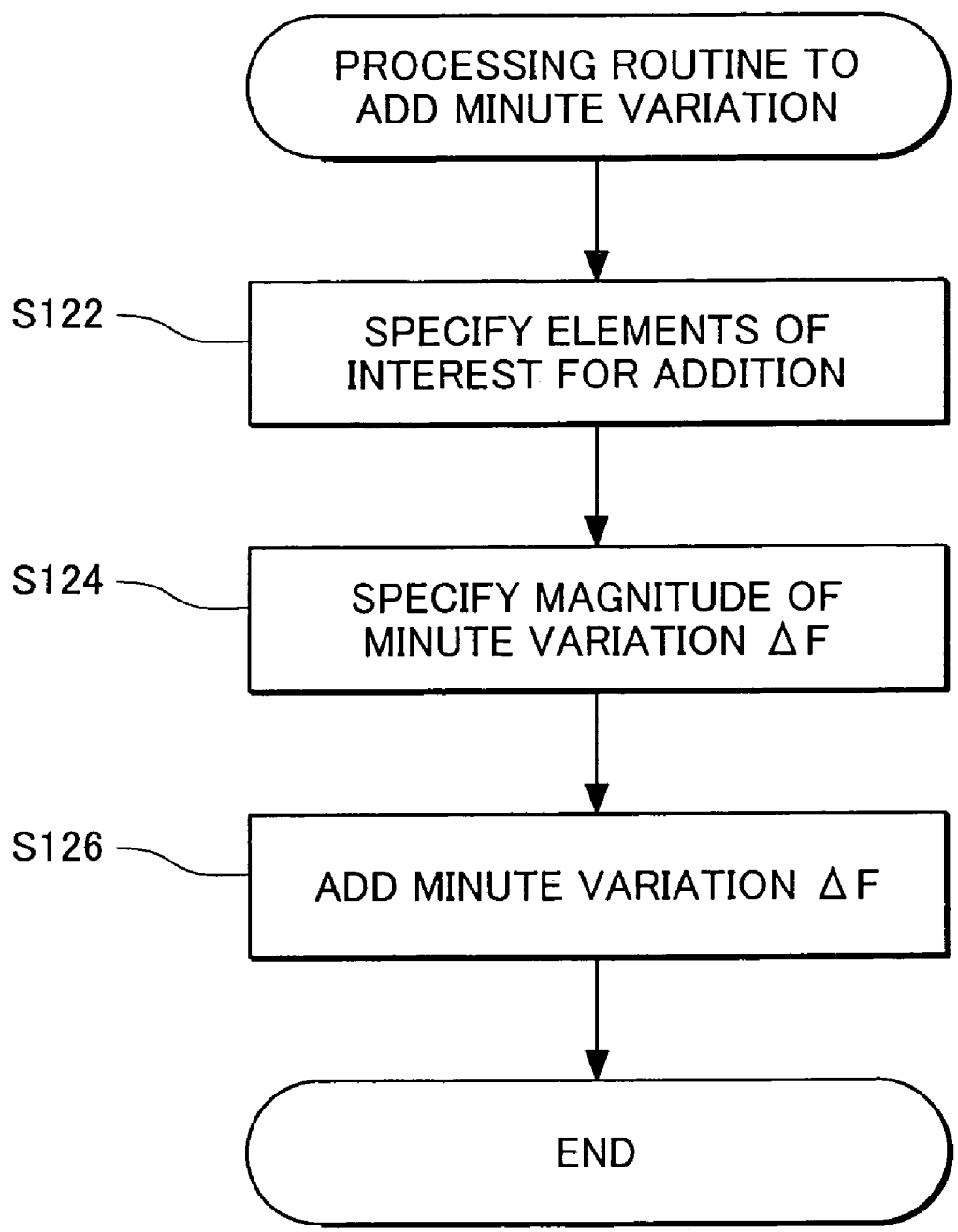
FIG. 6 is a flowchart showing the details of the process of adding the minute variation.

The process of adding the minute variation (step S120) is described in detail with referring to the flowchart of FIG. 6. A minute variation ΔF is added to either the real number array FR or the imaginary number array FI. The following description regards the addition to the imaginary number array FI. The addition to the real number array FR follows a similar procedure with a difference in symmetry. The procedure first specifies elements of interest, to which the minute variation ΔF is added (step S122). In the case of the addition of the minute variation ΔF in a high frequency domain or in the case of the sufficiently small magnitude of the minute variation ΔF, the minute variation ΔF added is visually unrecognizable on the resulting image obtained by the inverse transform. There is, however, some possibility that the minute variation added in the high frequency domain is lost by data compression. For the enhanced resistance against data compression, the procedure of this embodiment adds the minute variation ΔF, which has the restricted magnitude of not greater than a predetermined level, in a low frequency domain. Namely the elements of interest specified for the addition of the minute variation ΔF are restricted to the low frequency domain. In a concrete example, the procedure specifies elements FI(0,2) and FI(2, 0) for the addition of the minute variation ΔF (=1.0*10$^4$). According to Equations (2) representing the symmetry of the matrix F, the procedure also specifies elements FI(0,254) and FI(254,0) for subtraction of the minute variation ΔF. As discussed later, the eventual shape of the phase difference pattern as the digital watermark depends on the elements specified for addition of the minute variation ΔF and on the magnitude of the minute variation ΔF. The specification of the elements for addition of the minute variation is thus directly connected to the digital watermarking (the signature). The procedure of this embodiment accordingly does not fix the elements to which the minute variation ΔF is added nor the magnitude of the minute variation ΔF.

The procedure then specifies the magnitude of the minute variation ΔF (step S124). As described above, the magnitude of the minute variation ΔF affects the picture quality of the resulting image with the digital watermark embedded therein. A certain restriction is thus placed on the magnitude of the minute variation ΔF. The procedure of the embodiment regulates the magnitude of the minute variation ΔF to be within a range of 2 to 10% of the specified elements. In the concrete example, the procedure specifies the magnitude of the minute variation to approximately 5% of the elements.

The procedure adds the minute variation ΔF of the magnitude specified at step S124 to the elements specified at step S122 (step S126). In the concrete example, the procedure adds the minute variation ΔF=1.0×10$^4$ to the elements FI(0, 2) and FI(2,0) and subtracts the same value ΔF from the elements FI(0,254) and FI(254,0).

After completion of the addition of the minute variation, the inverse Fourier transform is carried out as shown in the flowchart of FIG. 3. The resulting image P1 (see FIG. 4B) obtained by the inverse Fourier transform is expressed by Equation (4) given below:

$$P1 = \{p1(m,n) | m,n=1, 2, \ldots, 255\} \quad (4)$$

In the processed image P1, only the imaginary number component is varied at its spatial frequency; that is, only the phase varies. The resulting image P1 is accordingly changed from the master image P0 by a phase component Δθ corresponding to the minute variation ΔF added. The difference between the pixel values p of these two images gives a phase difference W01. The phase difference W01 is defined by Equation (5) given below:

$$W01=\{w01(m,n)|m,n=1, 2, \ldots, 255\}$$

where $w01(m,n)=p0(m,n)-p1(m,n)$ \hfill (5)

Figure 4C:
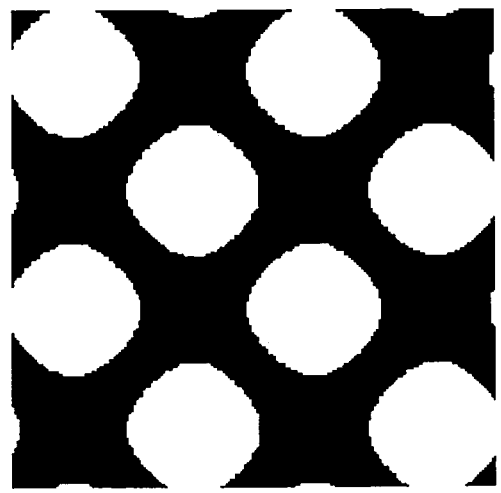

The absolute value |W01| of the phase difference W01 in Equation (5) is determined and illustrated as the pattern of FIG. 4C in this embodiment. This pattern is called the phase difference pattern. The phase difference pattern W01 depends upon the coordinate values (u,v) of the elements specified for the addition of the minute variation ΔF and the magnitude of the minute variation ΔF added. The phase difference pattern |W01| is accordingly regarded as the digital watermark. Varying the combination of:

(1) the selection of the elements to which the minute variation ΔF is added; with (2) the magnitude of the minute variation ΔF added to the elements ensures numerous variations of the phase difference pattern. The phase difference pattern is accordingly used as the electronic signature. The phase difference pattern used as the signature has a characteristic shape including a two-dimensional repetition as shown in FIG. 4C and is readily recognized by the human as a graphical pattern. The master image P0 in which the digital watermark is embedded should be closed to the public.

The digital watermark embedding apparatus and the corresponding method are described above as one embodiment of the present invention. Several conditions are required for the functions of the embedded data as the digital watermark. One of the conditions is the resistance against the noise occurring, for example, due to data compression as described previously. The embedding method of the embodiments adds the minute variation ΔF in the low frequency domain, so that the embedded data has sufficiently high resistance against a certain type of data compression that deletes information in a high frequency domain. The noise resistance is described in detail with some examples.

Figure 7A:
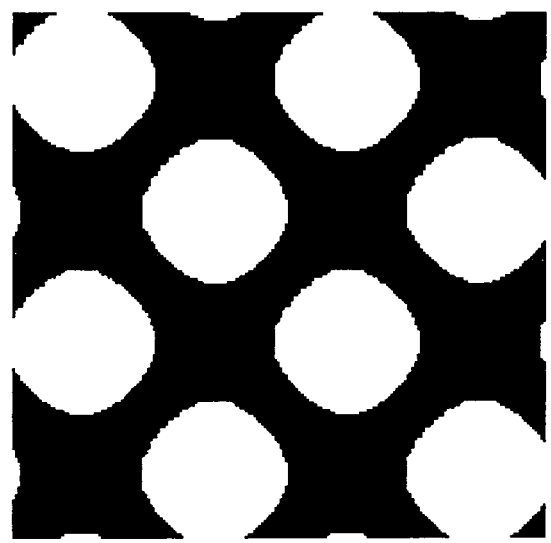
FIGS. 7A and 7B show a change of the phase difference pattern of the embodiment due to data compression.
Figure 7B:
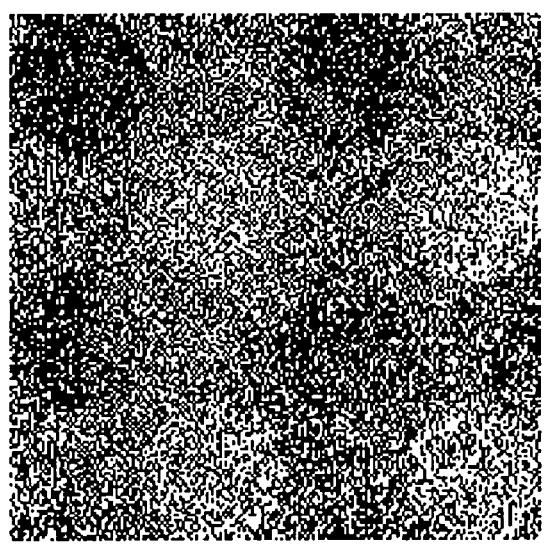

The discussion first regards the resistance against data compression. Here the digital watermark is embedded in the master image P0 according to the procedure discussed above. The procedure adds the minute variation ΔF corresponding to the phase difference pattern W01 to the Fourier spectrum of the master image P0 and carries out the inverse transform to obtain the image P1. The resulting image P1 is compressed to 75% by the JPEG technique. The data compression loses part of the information included in the master image and causes some noise. FIG. 7 shows an example of such cases. In the example of FIG. 7, the phase difference pattern |W01| (see FIG. 7A) embedded in the image P1 is changed to a phase difference pattern |W01'| (see FIG. 7B) extracted from a compressed image P1'. Regardless of the relatively high superposing noise, the shape of the phase difference pattern is not destroyed significantly. The phase difference pattern can thus be still used as the signature.

Figure 8A:
FIGS. 8A through 8C show changes of the image and the phase difference pattern due to partial replacement of the lower bit plane.
Figure 8B:
Figure 8C:
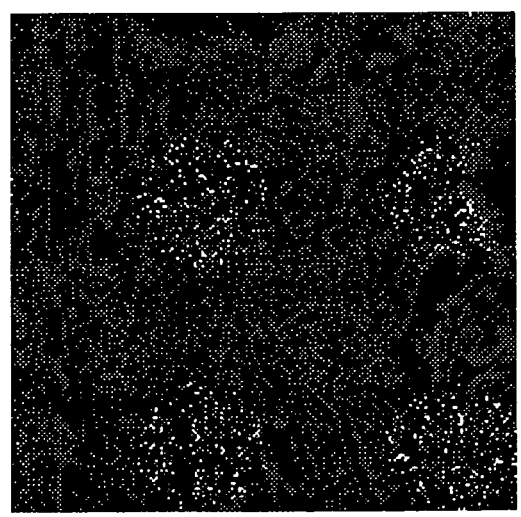

The description then regards the resistance of the digital watermark of the embodiment against deletion of a lower bit plane. FIG. 8A shows the phase difference pattern embedded in the mater image P0. Data with regard to a lower bit plane 0 to 2 are deleted from the authorized image P1 and replaced by the value '0'. FIG. 8B shows a resulting image P1' thus obtained. Replacement of the data in the lower bit plane 0 to 2 with the value '0' causes some noise. A phase difference pattern |W01'| extracted as the difference between the resulting image P1' and the master image P0 still has the characteristic of the embedded phase difference pattern as shown in FIG. 8C and thus functions as the digital watermark.

Figure 9A:
FIGS. 9A through 9C show changes of the image and the phase difference pattern due to white noise.
Figure 9B:
Figure 9C:
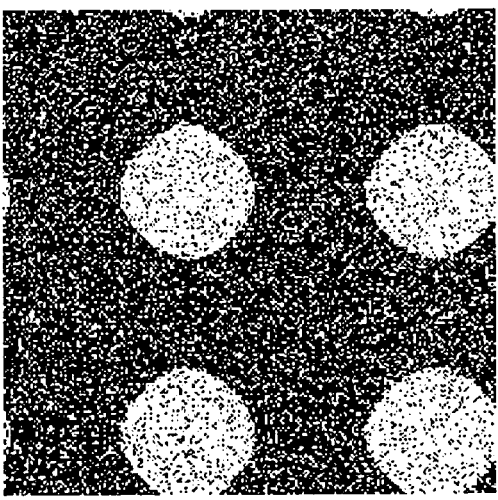

The discussion subsequently regards the resistance against white noise in the range of −40 dB to +40 dB applied to the image with the phase difference pattern embedded therein as the digital watermark. FIG. 9B shows a resulting image P1' with white noise added after embedding of the phase difference pattern |W01| shown in FIG. 9A. A phase difference pattern |W01'| extracted as the difference between the resulting image P1' and the master image P0 well keeps the characteristic of the embedded phase difference pattern as shown in FIG. 9C. The digital watermarking of the embodiment sufficiently functions even in the case of superposing white noise.

The above description shows the high resistance of the digital watermark of the embodiment against the diversity of noises. Other conditions required for the digital watermark are that only the person accepting the legal permission can take the digital watermark out of the image and that the watermark information can not be deleted or altered by any illegal technique. These points are described in detail below.

In this embodiment, the master image P0 is closed to the public, while the processed image P1 with the digital watermark embedded therein is open to the public. It is accordingly required that the watermark information can not be read without the permission from the processed image P1 with the digital watermark embedded therein. The image P1 with the digital watermark embedded therein consists of the master image P0 and the minute variation ΔF added to the Fourier spectrum of the master image P0. As long as the master image P0 is concealed, it is impossible for any third party to take the phase difference pattern |W01| functioning as the signature out of the authorized image P1.

Even when the Fourier spectrum is obtained by the Fourier transform of the authorized image P1, the watermarking of the embodiment does not allow specification of the magnitude of the minute variation ΔF and the elements F(u,v) to which the minute variation ΔF is added. The magnitude of the minute variation ΔF required for separation of the phase difference pattern |W01| is only several percent of the values of the elements. The minute variation ΔF is thus not conspicuous in the Fourier spectrum. The arrangement of the embodiment accordingly does not allow the minute variation added to some elements to be estimated from the values of the elements having a variation of only about 5%.

The discussion regards the resistance of the digital watermark against the overwriting attacks. A variety of techniques are applicable for the overwriting attacks against the digital watermark. One of the most heavily affecting techniques is the overwriting attacks according to the same algorithm. It is impossible to illegally identify or even estimate the magnitude of the minute variation ΔF or the elements F(u,v) to which the minute variation ΔF is added, from the authorized image P1. It is thus virtually impossible that the minute variation is illegally added under the identical conditions. There is, however, still some possibility that the person who understands the concept of the phase difference pattern tries to make overwriting attacks according to the same algorithm. Here it is thus assumed that the authorized image P1 is exposed to at least one overwriting attack. The person who makes an i-th overwriting attack (hereinafter referred to as the i-th forger) assumes an available image Pi-1 as the master image, embeds the phase difference pattern in the image Pi-1, and makes a resulting image Pi open to the public, and claims that the image Pi is the authorized image.

In this case, the i-th forger claims the difference between the two images Wi-1, i= Pi-1-Pi (i=2, 3, . . .) as the legal watermarking pattern.

The legal owner of the image P0 (that is, the legal signatory) readily obtains the phase difference $W0i=P0=Pi$ and $W1i=P1-Pi$, based on the image P1 open to the public by the legal signatory and the image Pi open to the public by the i-th forger. The eventual difference between these phase differences W0i and W1i is given as:

$$\Delta W = W0i - W1i = (P0-Pi) - (P1-Pi) = P0-P1 = W01$$

The legal owner of the image P0 can thus readily take the own signature W01 from the forged image Pi open to the public Pi. This means that the legal signature is still kept in the forged image Pi even when the image P1 open to the public is exposed to multiple overwriting attacks.

FIG. 10 shows an example of the above description in the case of i=2. The phase difference pattern |W01| of FIG. 10 (d) is added as the legal signature to the master image P0 shown in FIG. 10 (a) by a process S1. It is here assumed that the forgery carries out a process S2 to add another phase difference pattern to the legally processed image P1 (see FIG. 10 (b)) obtained by the process S1 and makes an illegally processed image P2 shown in FIG. 10(c) open to the public. In this case, a phase difference pattern |W02| shown in FIG. 10 (e) is obtained as the difference between the illegally processed image P2 open to the public and the master image P0. In a similar manner, a phase difference pattern |W12| shown in FIG. 10 (f) is obtained as the difference between the legally processed image open to the public by the legal owner and the master image P0. The eventual differnce between these two differences is obtained as a phase difference pattern shown in FIG. 10 (g). This perfectly coincides with the signature that the legal owner adds to the master image. In this example, i=2, so that the phase difference pattern W12 added by the forger is identified. As in the case of i=3, however, it is not necessary to known the phase difference pattern added by the forger. Even when the phase difference pattern added by the forger is unknown, this arrangement of the embodiment enables the phase difference pattern embedded by the legal owner to be accurately taken out of the image that has been exposed to plural overwriting attacks.

As described above, the digital watermark embedded by the method of the embodiment has sufficient resistance against the data compression as well as the plural overwriting attacks. Even in the combination of the overwriting attacks with the noise or data compression discussed above with reference to FIGS. 7 through 9, the phase difference pattern added to the mater image P0 is well preserved and used as the digital watermark.

Second Embodiment

C. Process of Embedding Watermark Information 2

Figure 11:
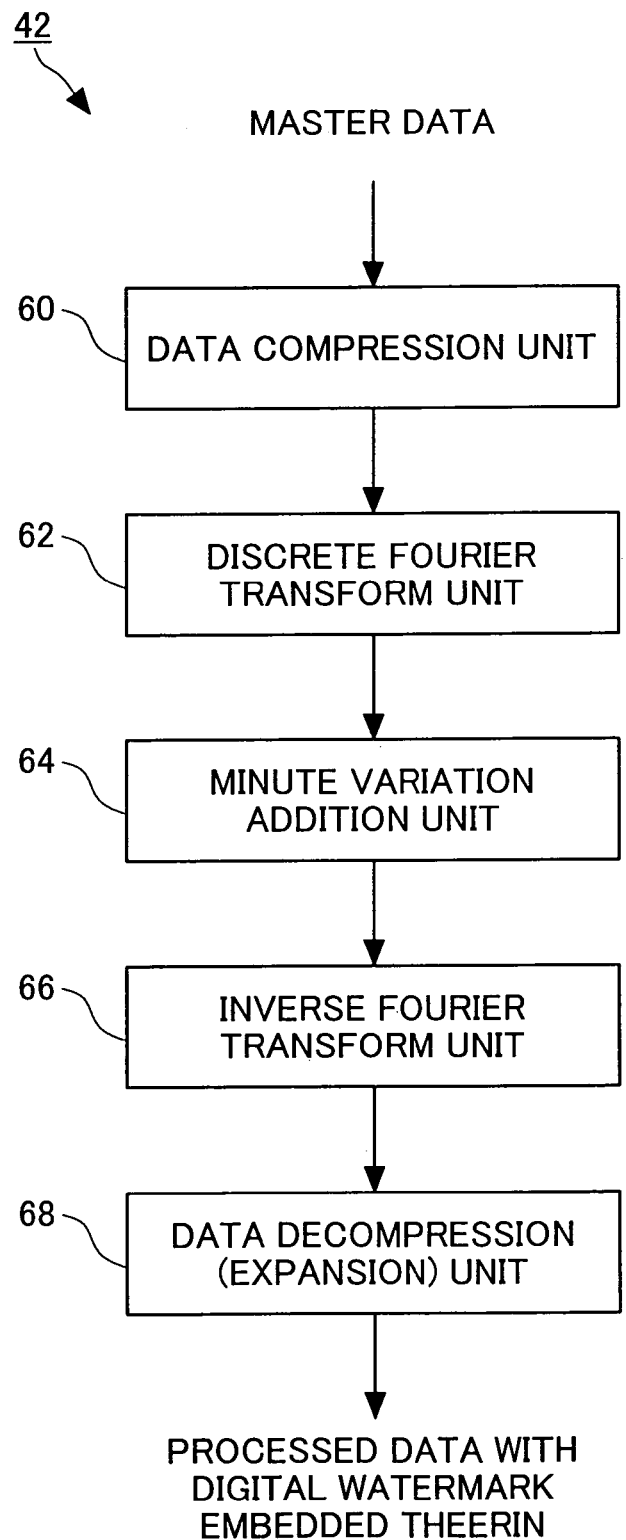
FIG. 11 is a flowchart showing a processing routine to embed watermark information executed in a second embodiment.

FIG. 11 is a functional block diagram showing the functions of the digital watermark embedding unit 42 in another embodiment. The digital watermark embedding unit 42 of this embodiment embeds the watermark information through a combination of a data compressing process with a process of regulating the phase of either a real number array or an imaginary number array to the Fourier transform. The series of the processing excluding the process relating to the data compression is identical with that executed in the first embodiment. The following description accordingly concentrates on the characteristic part of the second embodiment.

The digital watermark embedding unit 42 includes a data compression unit 60 and a data decompression (expansion) unit 68, in addition to a discrete Fourier transform unit 62, a minute variation addition unit 64, and an inverse Fourier transform unit 66 that are identical with the corresponding elements of the first embodiment. The data compression unit 60 and the data decompression (expansion) unit 68 respectively correspond to the data transform unit and the inverse transform unit of the present invention.

The functions characteristic of this embodiment are described briefly. The data compression unit 60 causes the image data read by the scanner 39 to undergo wavelet transform. Refer to 'Wavelet Beginner's Guide' (Tokyo Denki University Press 1995) for the details of the wavelet transform. The procedure of this embodiment applies the simplest orthogonal wavelet transform using the Haar basis.

Figure 12A:
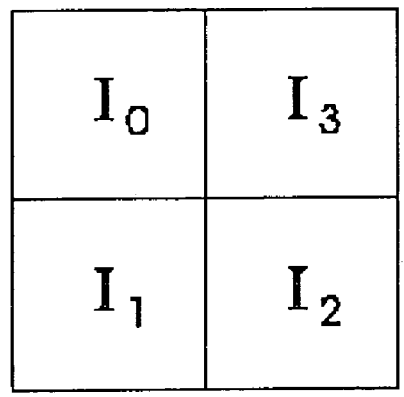
FIGS. 12A and 12B show the principle of Haar wavelet transform.

A transform of Equation (6) is defined with regard to an area of 2 by 2 pixels shown in FIG. 12A:

$$\begin{bmatrix} \omega 0 \\ \omega 1 \\ \omega 2 \\ \omega 3 \end{bmatrix} = \frac{1}{4} \begin{bmatrix} 1 & 1 & 1 & 1 \\ 1 & 1 & -1 & -1 \\ 1 & -1 & -1 & 1 \\ 1 & -1 & 1 & -1 \end{bmatrix} \begin{bmatrix} I0 \\ I1 \\ I2 \\ I3 \end{bmatrix} \quad (6)$$

Figure 12B:
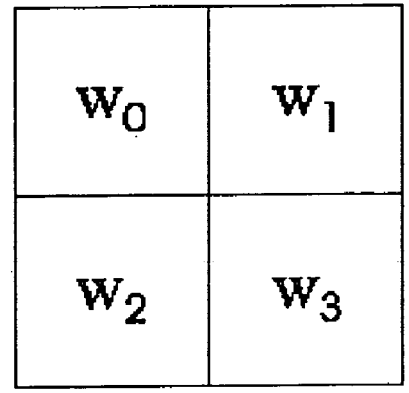
Figure 13:
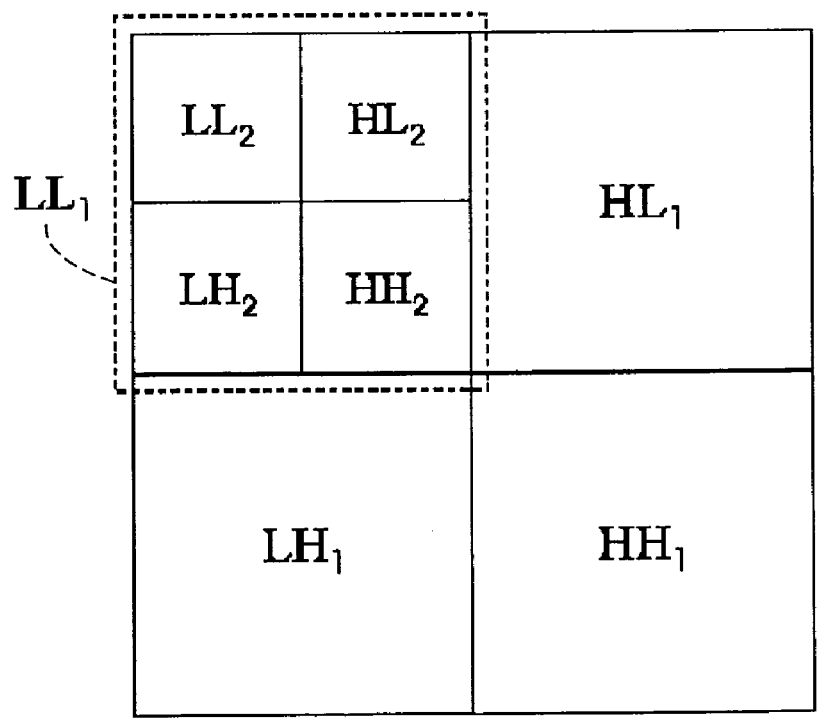
FIG. 13 shows a process of multi-resolution analysis of the image.

The results of the transform are shown in FIG. 12B. The method of applying this operation rule successively to 1/2×1/2 areas over the whole range of a given image according to the procedure shown in FIG. 13 is called the Haar wavelet transform. The decomposition is reflexively repeated n times until each portion LLn consists of 1×1 pixel. When a master image is halved both in the vertical direction and in the horizontal direction, LL1, LH1, HL1, and HH1 on the first level respectively represent a direct current component, a difference in the horizontal direction, a difference in the vertical direction, and a difference in the diagonal direction. LL denotes a multi-resolution approximation (hereinafter referred to as the MRA component), whereas LH, HH, and HL denote multi-resolution representation (hereinafter referred to as the MRR components). Namely the portion LL has the low frequency component of the image, and the other portions have the high frequency component of the image.

The general data compression technique typically follows an algorithm that deletes the high frequency component of the image. In the case where watermark information if embedded in the high frequency domain of the image, the watermark information may be lost in the process of compressing the image.

The prior to the Fourier transform discussed in the first embodiment, the procedure of the second embodiment carries out the wavelet transform of master image data and causes the multi-resolution approximation (MRA) component, which affluently keeps luminance information of the master image, to undergo the Fourier transform, so as to embed the watermark information as the phase difference pattern. This arrangement ensures the synergistic effects, that is, the heightened resistance against the data compression, which is relatively low in the case of embedding of the phase difference pattern by the Fourier transform alone, and easy discrimination of the overwriting attacks, which are not prevented by the wavelet transform alone.

After the processing of the data compression unit 60, the procedure embeds the phase difference pattern through the series of the processing carried out by the discrete Fourier transform unit 62, the minute variation addition unit 64, and the inverse Fourier transform unit 66 in the same manner as the first embodiment, and eventually activates the data decompression (expansion) unit 68 to carry out the inverse wavelet transform. This gives image data with the digital watermark embedded therein.

Figure 14:
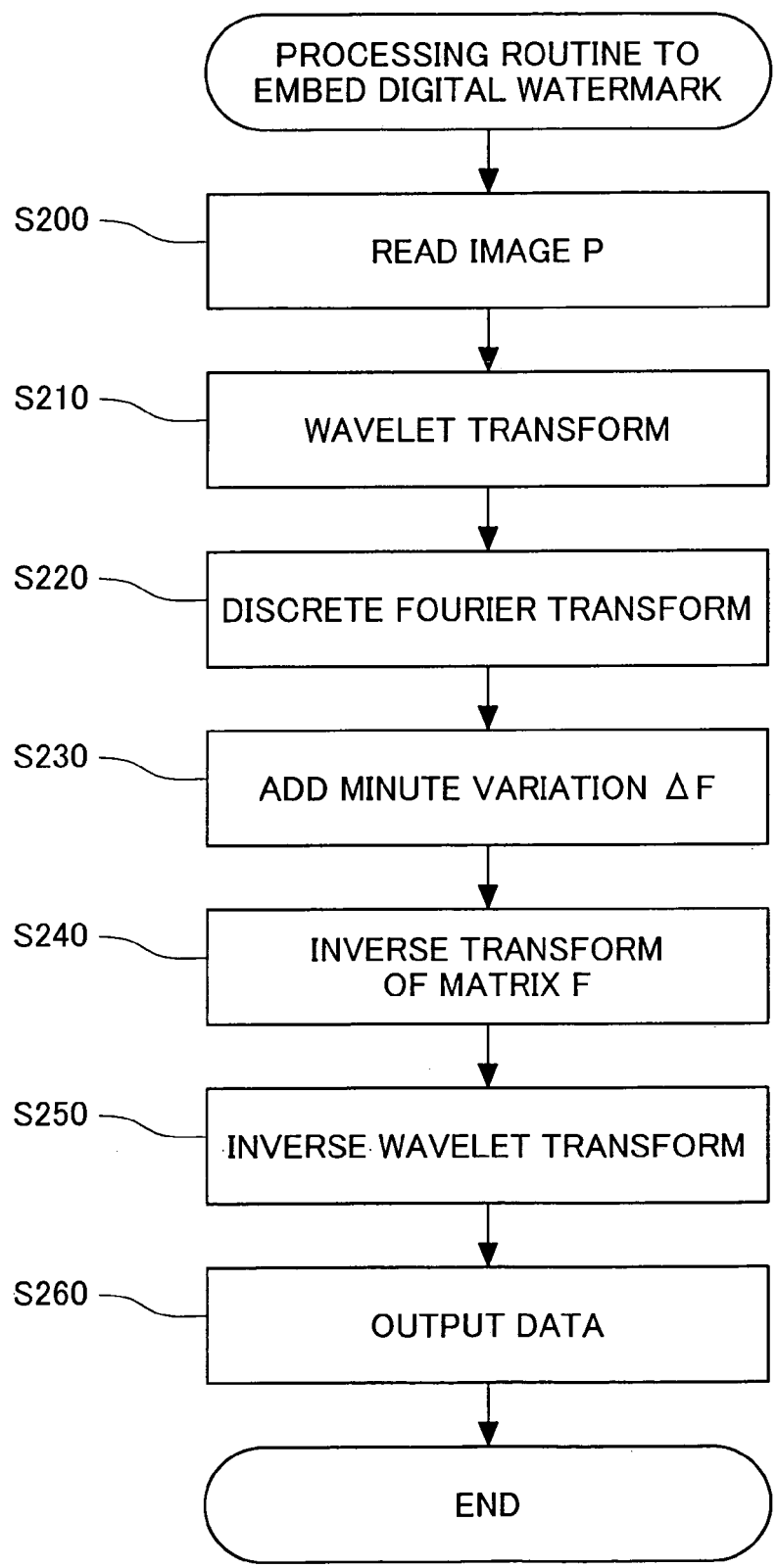
FIG. 14 is a flowchart showing a processing routine to embed watermark information executed in the second embodiment.
Figure 15:
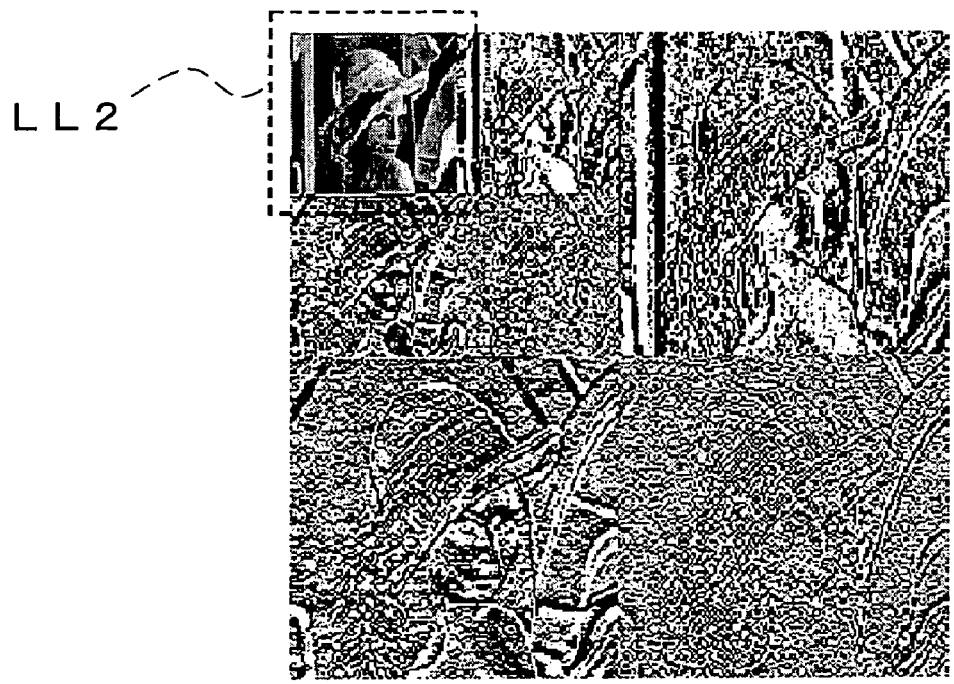
FIG. 15 shows decomposition to a second level in the second embodiment.

The following describes the procedure of embedding the digital watermark in the second embodiment with referring to the flowchart of FIG. 14. The flowchart of FIG. 14 shows a processing routine executed by the CPU 22 to embed a digital watermark. When the program enters the digital watermark embedding routine, the CPU 22 first reads a master image P0 (step S200) and causes the input image data to undergo the wavelet transform (step S210). FIG. 15 shows resulting image data obtained by decomposition of the master image data P0 shown in FIG. 4A to the second level. An area LL2 encircled by the broken line denotes the MRA component. As clearly understood from Equation (6) discussed above, this area is substantially equal to the down sampled standard data and mainly consists of the low frequency component.

The CPU 22 subsequently causes the image data in the area LL2 to undergo the discrete Fourier transform (step S220) and adds $\Delta FI(0,2)=\Delta FI(2,0)=1.0\times10^2$ as a watermark signal S1 to the coordinate values (0,2) and (2,0) of the imaginary number array FI obtained by the discrete Fourier transform (step S230). In order to keep the symmetry, at the same time, $\Delta FI(0,62)=\Delta FI(62,0)=-1.0\times10^2$ is added to the coordinate values (0,62) and (62,0).

Figure 16A:
FIG. 16A shows a resulting image with a watermark embedded therein.

The CPU 22 then carries out the inverse Fourier transform (step S240), causes the whole range of the image shown in FIG. 15 to undergo the inverse wavelet transform to the upper-most level (step S250), and outputs a final resulting image with the digital watermark information embedded therein (step S260). The series of processing gives a processed image Q1 (={q1(m,n)|m,n=0, 1, 2, . . . , 255}), which is changed from the master image P0 by a phase component $\Delta\theta$ corresponding to the minute variation $\Delta FI$ as shown in FIG. 16A. The addition of the digital watermark information causes substantially no deterioration of the picture quality of the resulting image Q1, compared with the master image P0. Even when the processed image Q1 is exposed to irreversible data compression that deletes the high frequency component, the digital watermark embedded in the area LL2 corresponding to the low frequency component is not lost.

Figure 16B:
FIG. 16B shows a resulting phase difference pattern obtained in the second embodiment.

Like the first embodiment, the digital watermark added as the phase difference pattern is defined by a difference between the pixel value of the two images {P0,Q1}, that is, by a phase difference W01 as discussed below. The inverse wavelet transform of the image LL2 shown in FIG. 15 to the upper-most level without any embedding process gives an image Q0 (={q0(m,n)|m,n=0, 1, 2, . . . , 255}). Here Q0 is approximately equal to P0. The absolute value |W01| of the phase difference W01 between the image Q0 and the processed image Q1 is determined and illustrated as the phase difference pattern of FIG. 16B. This phase difference pattern is used as the digital watermark.

In this embodiment, the master image P0 is required for extraction of the phase difference pattern. As long as the master image P0 is closed to the public, any third party can not extract the digital watermark information only from the processing image Q1. As discussed in the first embodiment, it is virtually impossible to estimate $\Delta FI(u,v)$ from the processed image Q1.

The digital watermarking of this embodiment also has the sufficient resistance against the overwriting attacks by the same algorithm. The i-th forger regards an available image Qi-1 as the master image, carries out the wavelet transform of the image Qi-1, adds the watermark signal Si according to the same algorithm, and carries out the inverse wavelet transform to generate a resulting image Qi. The i-th forger makes the image Qi open to the public and claims the difference between the two images Wi-1=Qi-1-Qi as the legal watermarking pattern.

The legal owner of the image P0 (that is, the legal signatory) readily obtains the phase difference W0i=Q0-Qi and W1i=Q1-Qi, based on the image Qi open to the public by the legal signatory and the image Qi open to the public by the i-th forger. The legal owner of the image Q0 ($\approx$P0) can prove that an eventual difference W01 has been embedded in the image Qi open to the public. The eventual difference is given as:

$$W0i-W1i=(Q0-Qi)-(Q1-Qi)=Q0-Q1=W01 \qquad (7)$$

The legal owner of the image Q0 can thus readily take the own signature W01 from the forged image Qi open to the public.

Figure 17A:
FIGS. 17A through 17I show the influence of multiple overwritting attacks on the resulting image with the watermark embedded therein.
Figure 17B:
Figure 17C:
Figure 17D:
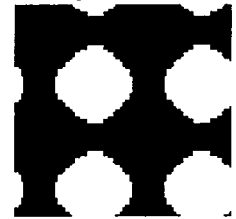
Figure 17E:
Figure 17F:
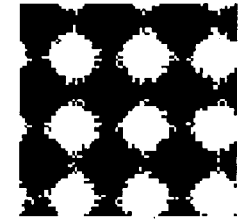
Figure 17G:
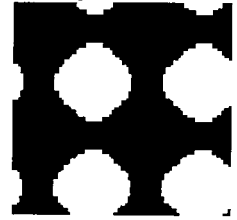

FIGS. 17A through 17(g) show an example of the above description in the case of i=2. Addition of the watermark signal S1 to the practical master image Q0 shown in FIG. 17A gives a legal processed image Q1. The difference between the images Q0 and Q1 defines the phase difference pattern of FIG. 17D. Even when the image Q1 is illegally overwritten by another watermark signal S2, the legal phase difference pattern is still kept in an illegally processed image Q2 as shown in FIG. 17(g).

Conspiratorial attacks are the severer version of the overwriting attacks. When the legal owner of the master image P0 delivers copies of the master image P0 (with different pieces of digital watermark information embedded therein) to two or more people, it is possible to estimate the master image P0 by he conspiracy of the receivers. In some forms of delivery, different signatures or digital watermarks are required for an identical image. For example, it is assumed that illegal copies are found after legal copies of one identical image are delivered to two or more people. In order to identify the source of the illegal copies, it is required to embed different signatures in the legal copies of the image. It is accordingly desirable to add different signatures to the image when plural copies are legally delivered to different channels. When there are two or more copies of the identical image with different digital watermarks embedded therein by the same algorithm, it becomes easier to illegally identify the digital watermarks embedded in the plurality of legal copies even if the master image is closed to the public.

Figure 17H:
Figure 17I:
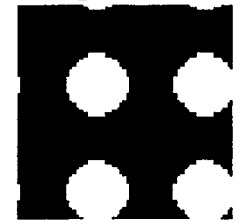
Figure 19A:
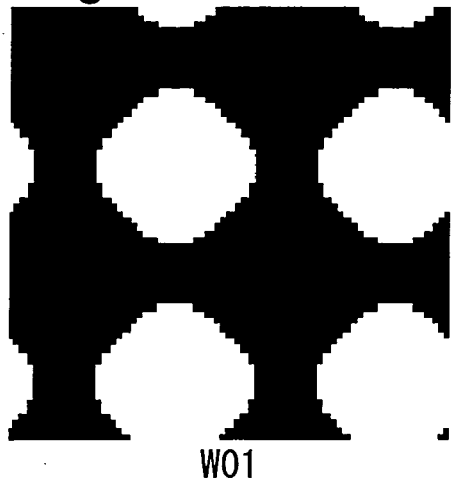
FIGS. 19A through 19F show results of evaluation of the resistance against JPEG compression.
Figure 19B:
Figure 19C:
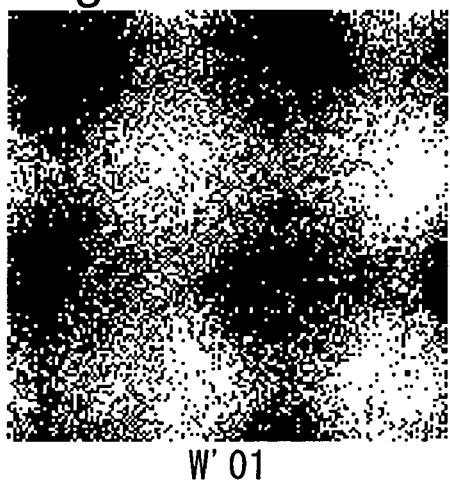
Figure 19D:
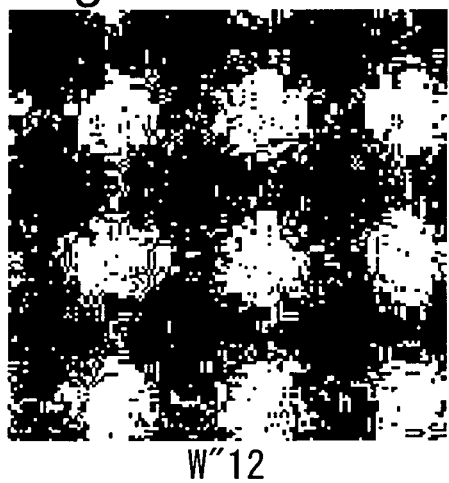
Figure 19E:
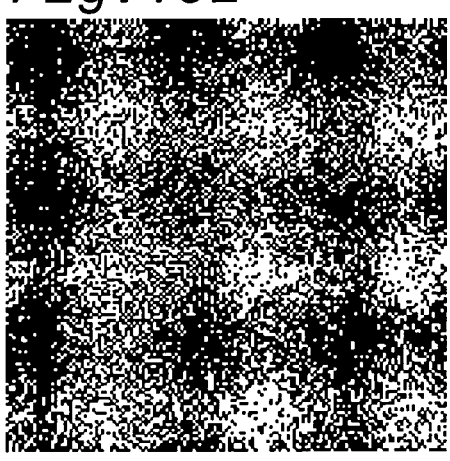
Figure 19F:
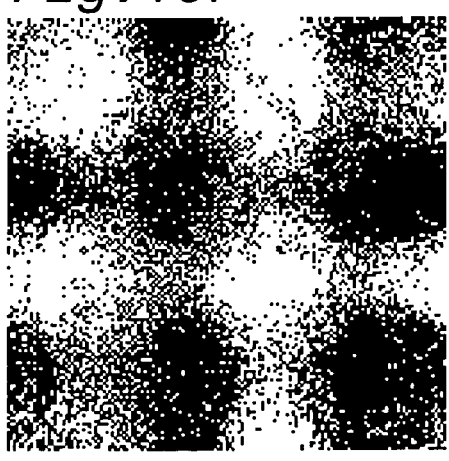
Figure 20A:
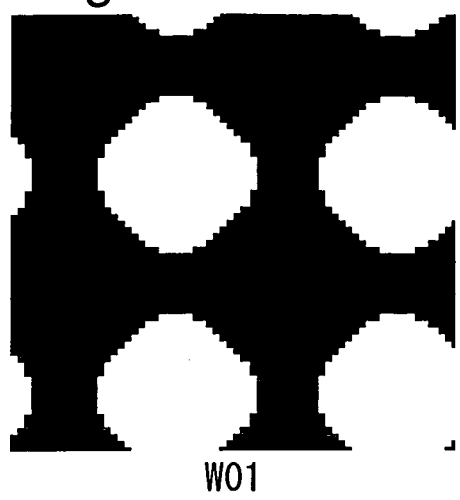
FIGS. 20A through 20F show results of evaluation of the resistance against deletion of the lower bit plane.
Figure 20B:
Figure 20C:
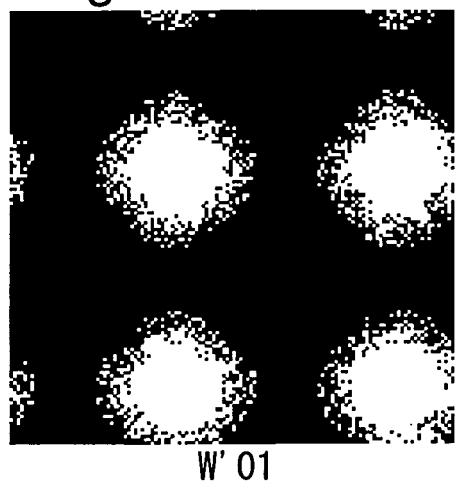
Figure 20D:
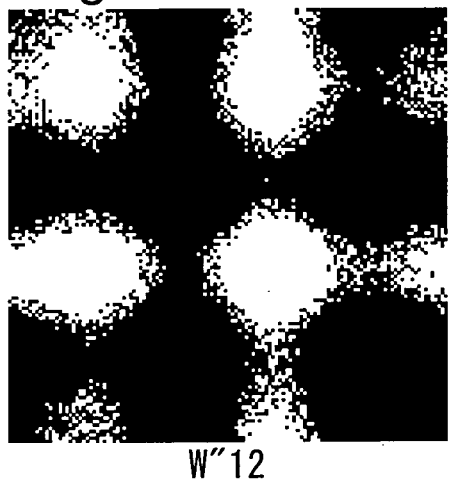
Figure 20E:
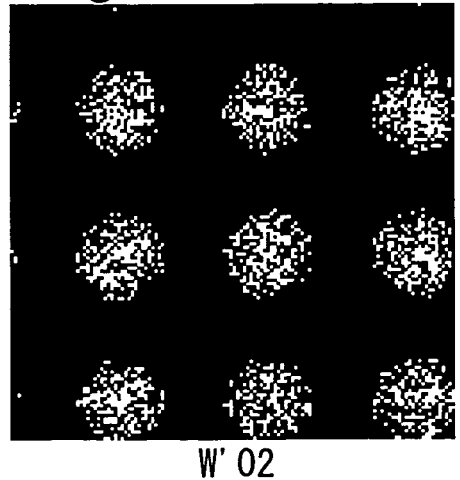
Figure 20F:
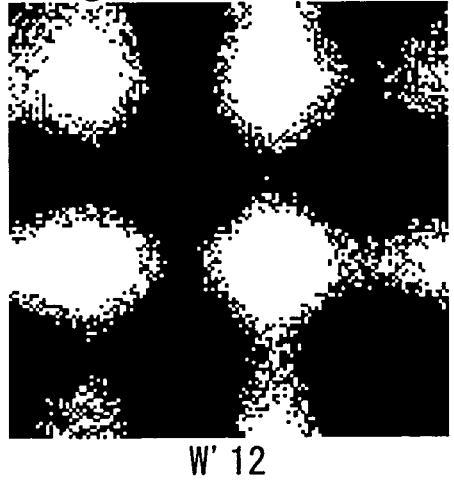

The following briefly describes the resistance of the digital watermarking of the embodiment against such conspiracy attacks. For the purpose of simplicity of discussion, it is assumed that processed copies Q1a and Q1b of an identical master image with different watermark signals S1a and S1b embedded therein are respectively delivered to receivers a and b. The watermark signals S1a and S1b are identified by calculating the different between frequency spectra F1a and F1b obtained by the Fourier transform of the copies Q1a and Q1b. When S1a is not equal to S1b, a Fourier spectrum F0 of the master image is estimated from the result of F(S1a,S1b) and the Fourier spectra F1a and F1b. The inverse conversion of the estimated Fourier spectrum F0 reconstructs an image Q0 approximate to the master image P0. This results in estimating a watermark signal S1. The effective countermeasure against such conspiratorial attacks compresses the processed copies of the master image with the minute variation $\Delta F$ embedded therein at different compression rates to distort the distributions of the frequency spectra F1a and F1b. Another effective countermeasure adds the minute variations $\Delta F$ of different absolute values at an identical position on the Fourier spectra. An example of the latter countermeasure is shown in FIGS. 17H through 17J. FIG. 17H shows an image obtained by embedding watermark signals S3 of different quantities at an identical position on the frequency spectra F1a and F1b. FIG. 17I shows the phase difference pattern corresponding to the watermark signal S3. In this example, the difference |S1a−S1b| between the frequency spectra F1a and F1b shown in FIG. 17J appears as a value accumulated at the identical position. It is practically impossible to estimate the values of spectra corresponding to the digital watermarks respectively added to the two copies of the master image.

The arrangement of the embodiment has advantages over other arrangements of image processing. FIGS. 18A through 18C show the mapping of phase difference patterns to resulting output images with a change of the value of the minute variation ΔF1(u,v), which is required to generate a processed image Q1 with the digital watermark embedded therein. This clearly shows that the increasing quantity of the embedded information deteriorates the picture quality and disturbs the image expression. Substantially no visual deterioration is, however, observed in the output image at the quantity of the embedded information up to ΔF1(u,v)=2.0. The quantity of the embedded information in this range is thus sufficiently practical.

FIG. 19 shows the results of an experiment with regard to the data compression and the overwriting attacks. FIG. 19A shows the phase difference pattern |W01| of the processed image Q1 with the digital watermark embedded therein according to the technique of the second embodiment. FIG. 19B shows a resulting image Q'1 when the processed image Q1 is compressed to 75% by the JPEG method. This image Q'1 includes some noise corresponding to the difference from a non-compressed master image Q0 (≈P0). In this state, the phase difference pattern W01 is changed to W'01=Q0−'1 as shown in FIG. 19C. When a third party embeds a phase difference pattern W"12 (−Q'1−Q'2) shown in FIG. 19D in the image Q'1, the phase difference pattern of the image is changed to W'02 as shown in FIG. 19E. In this case, the phase difference pattern W01 is extracted according to the following relation:

$$W'02-W'12=W'01 \approx W01 \qquad (8)$$

using a phase difference pattern W'12 (see FIG. 19F) obtained as the difference between the images Q1 and Q2.

FIG. 20 shows the resistance of the digital watermarking of the second embodiment against deletion of the lower bit plane. FIG. 20A shows the phase difference pattern |W01| added as the digital watermark. Data with regard to the lower bit plane of 0 to 1 in the image Q1 with the watermark signal S1 embedded therein are deleted and replaced with the value '0'. The image is then subjected to the normalized process to have the maximum value of 255. FIG. 20B shows an image Q'1 thus obtained. The deletion of the lower bit plane causes the difference between the image Q'1 and the master image P0 to have some noise, and the phase difference pattern W01 is changed to a phase difference pattern W'01 shown in FIG. 20C. When a third party embeds a phase difference pattern W"12 (=Q'1−Q'2) shown in FIG. 20D as a new digital watermark in the image Q'1, the phase difference pattern is changed to W'02 as shown in FIG. 20E. In this case, a pattern substantially identical with the legal phase difference pattern W01 is extracted according to Relation (8) given above using a phase difference pattern W'12 shown in FIG. 20F. The results of the experiment with the varying range of the lower bit plane to be deleted show that the phase difference pattern can be restored as long as the range of deletion of the lower bit plane is 0 to 3.

Figure 21A:
FIGS. 21A through 21F show results of evaluation of the resistance against addition of noise.
Figure 21B:
Figure 21C:
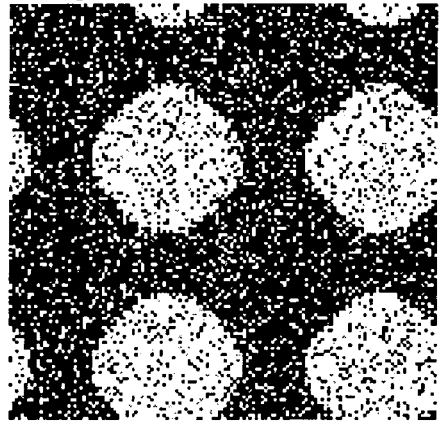
Figure 21D:
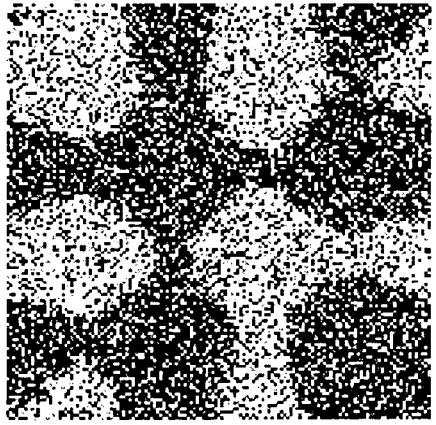
Figure 21E:
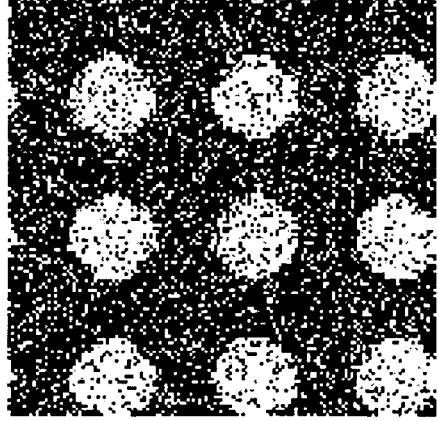
Figure 21F:
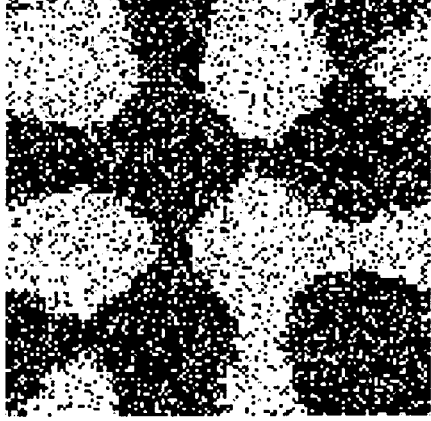
Figure 22A:
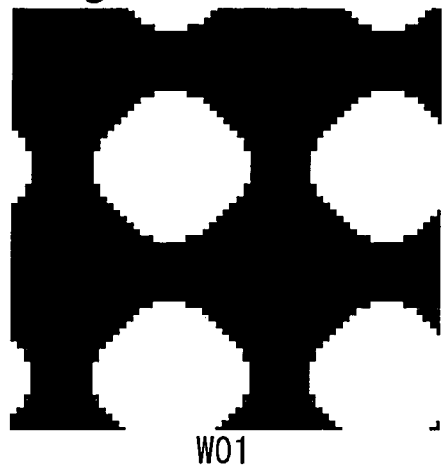
FIGS. 22A through 22F show results of evaluation of resistance against tone conversion.
Figure 22B:
Figure 22C:
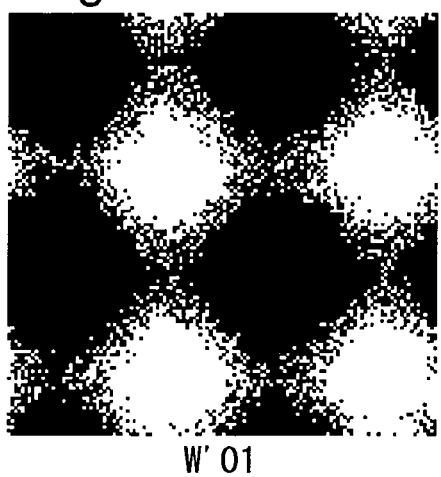
Figure 22D:
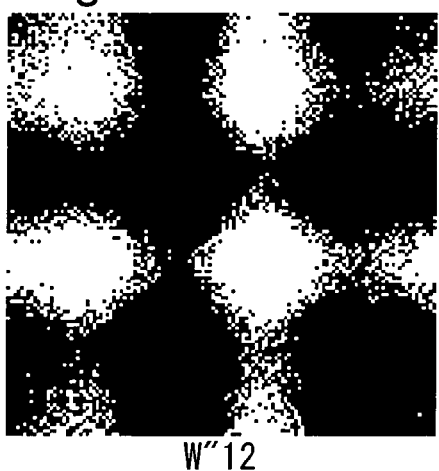
Figure 22E:
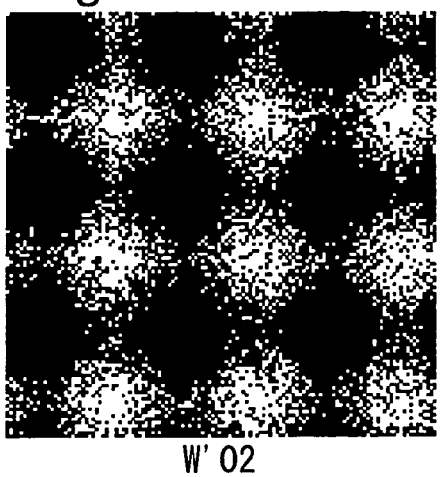
Figure 22F:
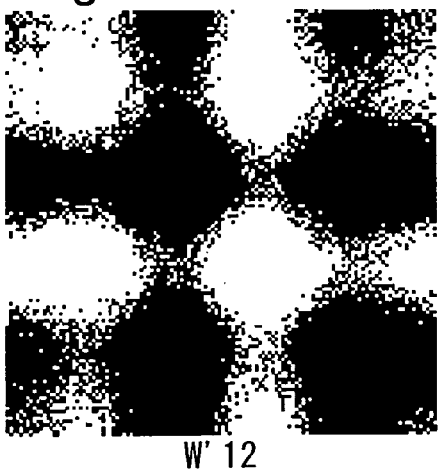

The following description regards the preservation of the watermark when a variety of noises are applied to the processing image with the digital watermark embedded therein. FIG. 21 shows the results of the experiment that applies Gaussian noise in the range of −40 dB to +40 dB to the image Q1 with the phase difference pattern W01 shown in FIG. 21A as the digital watermark signal S1. FIG. 21B shows a resulting image Q'1 with noise. In this case, the difference between the image Q'1 and the master image P0 causes noise, and the embedded phase difference pattern W01 is changed to a pattern W'01 as shown in FIG. 21C. When a third party embeds a phase difference pattern W"12 (=Q'1−Q'2) shown in FIG. 21D as a new digital watermark in the image Q'1 with noise, the phase difference pattern is changed to W'02 as shown in FIG. 21E. In this case, a pattern substantially identical with the phase difference pattern W01 corresponding to the legal digital watermark is extracted according to Relation (8) given above using a phase difference pattern W'12 (see FIG. 21F). Namely the digital watermarking of the embodiment has sufficiently resistance against such superposition of noise.

FIG. 22 shows the results of the experiment with tone conversion according to the error diffusion method. FIG. 22(a) shows the phase difference pattern |W01|. FIG. 22B shows the result of the processing that converts the image Q1 with the phase difference pattern W01 embedded therein as the watermark signal S1 to have only 6 tones. The tone reduction results in the image Q'1. The difference between the image Q'1 and the master image P0 causes some noise, and the embedded phase difference pattern W01 is changed to a phase difference pattern W'01 shown in FIG. 22C. When a third party embeds a phase difference pattern W"12 (=Q'12−Q'12) shown in FIG. 22D as a new digital watermark in the image Q'1, the phase difference pattern is changed to W'02 as shown in FIG. 22E. In this case, a pattern substantially identical with the phase difference pattern W01 corresponding to the legal digital watermark is extracted according to Relation (8) given above using a phase difference pattern W'12 shown in FIG. 22F.

As described above, the digital watermark embedded by the method of the second embodiment has sufficient resistance against the data compression as well as the plural overwritting attacks, and ensures practical resistance against the most malicious conspiratorial attacks. Even in the combination of the overwriting attacks with the noise or data compression discussed above with reference to FIGS. 19 through 22, the phase difference pattern added to the master image P0 is well preserved and used as the digital watermark.

The present invention is not restricted to the above embodiments or their modifications, but there may be many other modifications, changes, and alterations without departing from the scope or spirit of the main characteristics of the present invention. For example, one modified procedure adds the minute variation to the real number array of the matrix obtained by the Fourier transform. Another modified procedure adds the minute variation to the elements corresponding to a high frequency domain of the matrix obtained by the Fourier transform. The data transform for specifying the area mainly consisting of the low frequency component is not restricted to the wavelet transform, but may be carried out by any other suitable method. Here the wavelet transform is not limited to the Haar wavelet transform but includes the wavelet transform according to another basis or technique.

INDUSTRIAL APPLICABILITY

The technique of the present invention is applicable for apparatuses of embedding watermark information in electronic data and apparatuses of electronic identification. The technique is effectively applied for embedding copyright information, for personal identification in the case of electronic transactions, and for cryptography that includes apparatuses and methods of encryption, transmission, and decryption.

What is claimed is:

1. A method of embedding watermark information in master data, said method comprising the steps of:
   (a) causing the master data to be subjected to discrete Fourier transform;
   (b) adding a minute variation, which corresponds to a phase difference pattern determined in advance as the watermark information, to either one of a real number array and an imaginary number array of the master data obtained by the discrete Fourier transform, so as to generate resulting data with the minute variation added thereto;
   (c) causing the resulting data with the minute variation added thereto to be subjected to inverse Fourier transform, so as to generate authorized data with the watermark information embedded therein;
   (a0) causing the master data to be subjected to a predetermined data transform, which converts the master data to a specific data form that enables an area mainly corresponding to a low frequency component to be specified prior to the discrete Fourier transform in said step (a); and
   (ax) carrying out an inverse transform of the predetermined data transform performed in said step (a0), after the inverse Fourier transform in said step (c),
   wherein said step (a) causes a specific data portion, which represents the area mainly corresponding to the low frequency component and is selected out of the data converted in said step (a0), to be subjected to the discrete Fourier transform.

2. A method in accordance with claim 1, wherein said step (b) adds a minute variation $\Delta F$ to a spectrum $F(m,n)$ of a specific frequency $(m,n)$ in either one of the real number array and the imaginary number array.

3. A method in accordance with claim 2, wherein said step (b) carries out the addition of the minute variation $\Delta F$ while keeping symmetry of either one of the real number array and the imaginary number array.

4. A method in accordance with claim 3, wherein the minute variation added is within a range of 2 to 10% of the spectrum.

5. A method in accordance with claim 1, wherein either one of the real number array and the imaginary number array, to which the minute variation is added in said step (b), is a component in a low frequency domain.

6. A method in accordance with claim 1, wherein the predetermined data transform is wavelet transform and the inverse transform of the predetermined data transform is inverse wavelet transform.

7. A method in accordance with claim 1, wherein the master data is two-dimensional image data.

8. A method of detecting embedded watermark information when there is authorized data, which is obtained by embedding the watermark information in master data according to the embedding method in accordance with claim 1, said detecting method comprising the steps of:
   taking out a difference between the master data and the authorized data as a phase difference pattern; and
   detecting the phase difference pattern as a digital watermark of the authorized data.

9. A method of detecting embedded watermark information when there is authorized data, which is obtained by embedding the watermark information in master data according to the embedding method in accordance with claim 1, said detecting method comprising the steps of:
   causing the master data to be subjected to the predetermined data transform of said step (a0);
   causing the authorized data to be subjected to the predetermined data transform of said step (a0);
   taking out a difference between the transformed master data and the transformed authorized data as a phase difference pattern; and
   detecting the phase difference pattern as a digital watermark of the authorized data.

10. A method of identifying a phase difference pattern W1 that is watermark information embedded in master data P0, when there is data Pi obtained by embedding other phase difference patterns Wi(i=2,3, . . . ) in authorized data P1 as watermark information a plurality of times according to the embedding method in accordance with claim 1, where the authorized data P1 is obtained by legally embedding the phase difference pattern W1 in the master data P0 as the watermark information, said identifying method comprising the steps of:
   (d) taking out a difference between the master data P0 and the data Pi with the other phase difference patterns embedded therein the plurality of times;
   (e) taking out a difference between the authorized data P1 and the data Pi with the other phase difference patterns embedded therein the plurality of times; and
   (f) extracting an eventual difference between the difference taken out in said step (d) and the difference taken out in said step (e) as the legal phase difference pattern W1.

11. An apparatus for embedding watermark information in master data, said apparatus comprising:
   a data transform unit that causes the master data to be subjected to a predetermined data transform, which converts the master data to a specific data form that enables an area mainly corresponding to a low frequency component to be specified;
   a transform unit that causes a specific data portion corresponding to the area out of the converted data to be subjected to discrete Fourier transform;
   a phase difference pattern addition unit that adds a minute variation, which corresponds to a phase difference pattern determined in advance as the watermark information, to either one of a real number array and an imaginary number array of the specific data portion obtained by the discrete Fourier transform, so as to generate resulting data with the minute variation added thereto;
   an inverse Fourier transform unit that causes the resulting data with the minute variation added thereto to be subjected to inverse Fourier transform; and
   an inverse transform unit that causes the resulting data, which has undergone the inverse Fourier transform, as well as a residual data portion corresponding to a residual area to be subjected to an inverse transform of the predetermined data transform, so as to generate authorized data with the watermark information embedded therein.

12. A storage medium in which a specific program used to embed watermark information in master data is stored in a computer readable manner, said specific program causing a computer to attain the functions of:

inputting the master data;

causing the master data to be subjected to a predetermined data transform, which converts the master data to a specific data form that enables an area mainly corresponding to a low frequency component to be specified;

causing a specific data portion corresponding to the area out of the converted data to be subjected to discrete Fourier transform;

adding a minute variation, which corresponds to a phase difference pattern determined in advance as the watermark information, to either one of a real number array and an imaginary number array of the specific data portion obtained by the discrete Fourier transform, so as to generate resulting data with the minute variation added thereto;

causing the resulting data with the minute variation added thereto to be subjected to inverse Fourier transform; and causing the resulting data, which has undergone the inverse Fourier transform, as well as a residual data portion corresponding to a residual area to be subjected to an inverse transform of the predetermined data transform, so as to generate authorized data with the watermark information embedded therein.

* * * * *

UNITED STATES PATENT AND TRADEMARK OFFICE
CERTIFICATE OF CORRECTION

PATENT NO. : 6,983,058 B1
APPLICATION NO. : 09/786664
DATED : January 3, 2006
INVENTOR(S) : Fukuoka et al.

It is certified that error appears in the above-identified patent and that said Letters Patent is hereby corrected as shown below:

Column 2, line 66, change "compressing" to --compression--.

Column 5, line 25, change "overwriting attach" to --overwriting attack--.

Column 11, line 36, change "embodiments" to --embodiment--.

Column 13, line 32, change "differnce" to --difference--.

Column 13, line 61, change "array to the" to --array of the--.

Column 14, line 38-39, change "representation" to --representations--.

Column 14, line 45, change "information if" to --information is --.

Column 16, line 33, change "by he" to --by the--.

Column 16, line 54, change "the different" to --the difference--.

Column 17, line 53, change "normalized" to --normalization--.

Column 18, line 5, change "processing image" to --processed image--.

Column 18, line 22, change "has sufficiently" to --has sufficient--.

Signed and Sealed this

Third Day of October, 2006

JON W. DUDAS
*Director of the United States Patent and Trademark Office*